United States Patent
Hind et al.

(10) Patent No.: US 6,941,511 B1
(45) Date of Patent: Sep. 6, 2005

(54) HIGH-PERFORMANCE EXTENSIBLE DOCUMENT TRANSFORMATION

(75) Inventors: John R. Hind, Raleigh, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 09/653,080

(22) Filed: Aug. 31, 2000

(51) Int. Cl.$^7$ .............................................. G06F 15/00
(52) U.S. Cl. ...................... 715/523; 715/513; 715/524; 717/143
(58) Field of Search ................................ 715/511, 522, 715/523, 513, 517; 717/143

(56) References Cited

U.S. PATENT DOCUMENTS 6,249,794 B1 * 6/2001 Raman ........................ 715/500
6,336,124 B1 * 1/2002 Alam et al. .................. 715/523

OTHER PUBLICATIONS

Java Apache Project, Cocoon, Copyright 1999, pp. 1–9.*
W3C Extensive Stylesheet Language (XSL) Version 1.0, Mar. 27, 2000, pp. 1–15.*
"SML: Simplifying XML", by Robert E. La Quey, pp. 1–5, published on XML.com Nov. 24, 1999, http://www.-xml.com/print/_1999/11/sml/ndex.html.

* cited by examiner

Primary Examiner—Stephen S. Hong
Assistant Examiner—Matthew J. Ludwig
(74) Attorney, Agent, or Firm—Marcia L. Doubet; Jeanine S. Ray-Yarletts

(57) ABSTRACT

The present invention provides a method, system, and computer program product for applying transformations to extensible documents, enabling reductions in the processing time required to transform arbitrarily-structured documents having particular well-defined elements. Signatures for structured document types are defined, along with one or more transformations to be performed upon documents of that type. The transformations are specified using syntax elements referred to as maps. A map specifies an operation code for the transformation to be performed, and describes the input and output of the associated transformation. A special map processing engine locates an appropriate transformation object to a particular input document at run-time, and applies the transformation operation according to the map definition. This technique is preferably used for a set of predetermined core transformations, with other transformations being processed using stylesheet engines of the prior art. The input documents may be encoded in the Extensible Markup Language (XML), or in other structured notations. The techniques of the present invention are particularly well suited to use in high-volume and throughput-sensitive environments such as that encountered by business-to-business transaction servers.

37 Claims, 22 Drawing Sheets

FIG. 1
(PRIOR ART)

```
<NAMES>
    <NAME>
        <LAST_NAME>105
        Erwin
        </LAST_NAME>110
        <FIRST_NAME>115
        Cody120
        </FIRST_NAME> 125
        <MIDDLE_INITIAL />
    </NAME>
    <NAME>
        <LAST_NAME SUFFIX = "Jr.">130
                                    135
        Curtis
        </LAST_NAME>140
        <FIRST_NAME>
        John
        </FIRST_NAME>
        <MIDDLE_INITIAL />
    </NAME>
</NAMES>
```

```
<root_element> 402
    <level_one_element1 id="1" name="1"> 410
        A
        <level_two_element11> B </level_two_element11> 412
        <level_two_element12> C </level_two_element12> 414
    </level_one_element1>
    <level_one_element2 id="2" name="2"> 420
        D
        <level_two_element21> E </level_two_element21> 422
    </level_one_element2>
</root_element>
```

470 → 6(root_element;1,4;;;)(level_one_element1;2,3;0.2.2.1,3.4.7.1;8,1)
(level_two_element11;;;9,1)(level_two_element12;;;10,1)
(level_one_element2;5;11.2.13.1,14.4.18.1;19,1)
(level_two_element21;;;20,1)id1name1ABCid2name2DE ← 480

FIG. 7

```
        705      710
<MAP OPCODE = "RENAME">
    <PARAM>715
        <SNODE>720   725      730
            <XMLDATA TAG = "LAST_NAME" />
        </SNODE>735
        <TNODE>740   745
            <TAG>SURNAME</TAG>
        </TNODE> 750
    </PARAM>
</MAP>
```

700

```
<!ELEMENT operation (map+)>
<!ATTLIST operation
    name CDATA #IMPLIED>

<!ELEMENT map (param+)>
<!ATTLIST map
    opcode (CDATA) #REQUIRED>

<!ELEMENT param (snode, tnode)>

<!ELEMENT snode (xmldata)>
<!ATTLIST snode
    doc CDATA #IMPLIED
    collatekey CDATA #IMPLIED
    pathback CDATA #IMPLIED>

<!ELEMENT xmldata (xml_attribute*)>
<!ATTLIST xmldata
    tag CDATA #IMPLIED
    level CDATA #IMPLIED
    xpathindex CDATA #IMPLIED
    group CDATA #IMPLIED
    invertmatch (true|false) "false">
```

| FIG. 8A |
|---|
| FIG. 8B |

```
<!ELEMENT xml_attribute (#PCDATA)>
<!ATTLIST xml_attribute
    name CDATA #REQUIRED
    value CDATA #IMPLIED
    group CDATA #IMPLIED
    invertmatch (true|false) "false">

<!ELEMENT tnode (tag?, attribute*, anchor?)>
<!ATTLIST tnode
    doc CDATA #IMPLIED
    collatekey CDATA #IMPLIED>

<!ELEMENT tag (#PCDATA)>

<!ELEMENT attribute (#PCDATA)>
<!ATTLIST attribute
    name CDATA #REQUIRED
    value CDATA #REQUIRED>

<!ELEMENT anchor (xmldata)>
<!ATTLIST anchor
    rel CDATA #IMPLIED
    place CDATA #IMPLIED>
```

```
900
  <Operations>
    <operation name="splitOrders">  905
      <map opcode="DELETE"> 910
        <param>
          <snode>
            <xmldata tag="log" level="4" /> 915
          </snode>
          <tnode />
      </map>
      <map opcode="FILTER"> 920
        <param>
          <snode>
            <xmldata tag="Item" level="4" pathback="2"> 925
              <xml_attribute name="description" value="tv-19" group="external" />  ⎤ 930
              <xml_attribute name="description" value="vcr" group="external" />    ⎦
            </xmldata>
          </snode>
          <tnode doc="externalPOs"> 935
            <tag>Item</tag>
            <anchor rel="PARENT"> 940           945
              <xmldata tag="externalPurchaseOrders" level="1" />
            </anchor>
          </tnode>
        </param>
        <param>
          <snode pathback="1">
            <xmldata tag="POSummary" level="3" />
          </snode>
          <tnode doc="externalPOs" />
        </param>
```

| FIG. 9A |
|---|
| FIG. 9B |

```
<param>
  <snode>
    <xmldata tag="Item" level="4">
      <xml_attribute name="description" value="tv-19" invertmatch="true" />
      <xml_attribute name="description" value="vcr" invertmatch="true" />
    </xmldata>
  </snode>
  <tnode doc="internalPOs">
    <tag>Item</tag>
    <anchor rel="PARENT">
      <xmldata tag="internalPurchaseOrders" level="1" />
    </anchor>
  </tnode>
</param>
<param>
  <snode pathback="1">
    <xmldata tag="POSummary" level="3" />
  </snode>
  <tnode doc="internalPOs" />
</param>
</map>
</operation>
```

950 — the two xml_attribute lines
955 — `<tnode doc="internalPOs">`
960 — `<anchor rel="PARENT">`
965 — `<xmldata tag="internalPurchaseOrders" level="1" />`

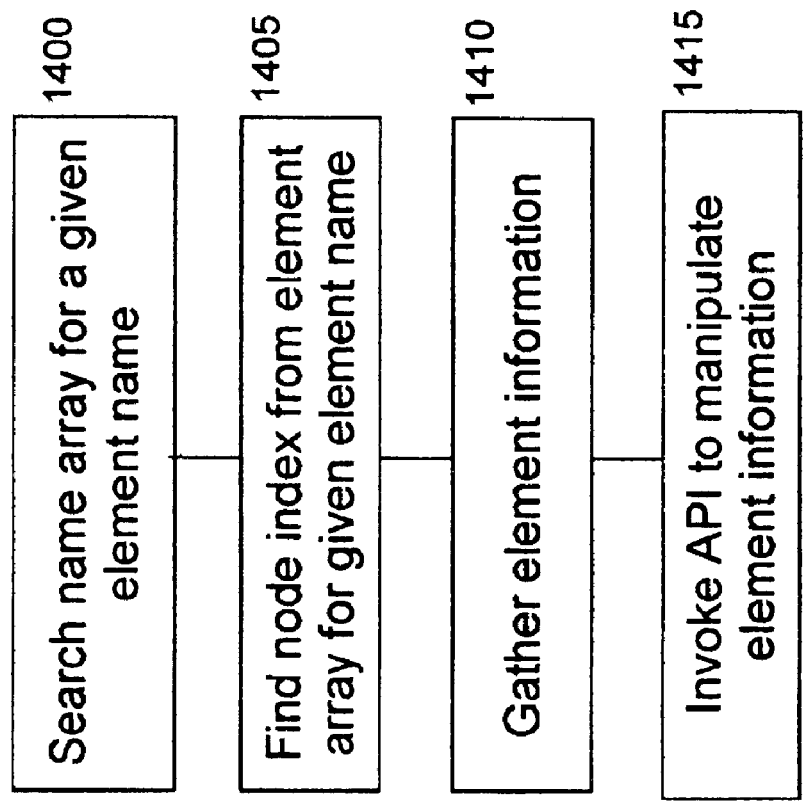

HIGH-PERFORMANCE EXTENSIBLE DOCUMENT TRANSFORMATION

RELATED INVENTIONS

The present invention is related to titled "Machine-Oriented Extensible Document Representation and Interchange Notation" (Ser. No. 09/652,056), referred to herein as the "first related invention", and U.S. Pat. No. titled "Array-Based Extensible Document Storage Format" (Ser. No. 09/652,296), referred to herein as the "second related invention", both of which were filed concurrently herewith. These related inventions are commonly assigned to International Business Machines Corporation (IBM), and are hereby incorporated herein by reference.

BACKGROUND OF THE INVENTION

1. Field of the Invention

The present invention relates to a computer system, and deals more particularly with a method, system, and computer program product for enabling high-performance transformations on extensible structured documents, such as Extensible Markup Language (XML) documents (where those documents may have first been converted to an efficient internal storage representation such as that described in the second related invention).

2. Description of the Related Art

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web") are well-known examples of this type of environment wherein the multiple computers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

The Extensible Markup Language ("XML") is becoming the de facto standard format for representing and exchanging information in these environments. XML is a tag language, which is a language that uses specially-designed constructs referred to as "tags" to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags in XML, the syntax "<email>" could be used as a tag to indicate that the character string appearing in the data stream after this tag is to be treated as an e-mail address; the syntax "</email>" would then be inserted after the character string, to delimit where the e-mail character string ends.

The syntax of XML is extensible and flexible, and allows document developers to create tags to convey an explicit nested tree document structure (where the structure is determined from the relationship among the tags in a particular document). Furthermore, document developers can define their own tags which may have application-specific semantics. Because of this extensibility, XML documents may be used to specify many different types of information, for use in a virtually unlimited number of contexts. It is this extensibility and flexibility which is, in large part, responsible for the popularity of XML. (A number of XML derivative notations have been defined, and continue to be defined, for particular purposes. "VoiceXML" is an example of one such derivative. References herein to "XML" are intended to include XML derivatives and semantically similar notations such as derivatives of the Standard Generalized Markup Language, or "SGML", from which XML was derived. Refer to ISO 8879, "Standard Generalized Markup Language (SGML)", (1986) for more information on SGML. Refer to "Extensible Markup Language (XML), W3C Recommendation 10 Feb. 1998" which is available from the World Wide Web Consortium, or "W3C", for more information on XML.)

Although XML is an excellent data format, the parsing, manipulation, and transformation of XML documents involves a considerable amount of overhead. FIG 1 provides a simple example of prior-art XML syntax for a document 100 that may be used for specifying names (for example, names of the employees of a corporation, the customers of a business, etc.). In this example, a <LAST_NAME> tag pair 105, 110 is used to represent information for a last name, and a <FIRST_NAME> tag pair 115, 120 is used to represent information for a first name. The data content values for the last name and first name then appear (as a string, in this case) between the opening and closing tags. The <MIDDLE_INITIAL/> tag 125 in this case uses a short-hand empty tag format where the tag name of a tag having no data content is followed by a closing tag symbol "/>". XML tags may also contain attribute names and attribute values, as shown by the 'SUFFIX="Jr."' attribute 135 specified within the opening <LAST_NAME> tag 130. As can be seen upon inspection of this document 100, the entire data content of this example comprises 22 characters. The tag syntax, however, adds another 201 printable characters (not including tabs, line returns, blanks, etc.), or approximately 90 percent of the total document file size. In the general case, the overhead in terms of characters used for the tag syntax could be even higher, as the tag names might be even longer than those shown. In addition, the data content specified in this example as an attribute (shown at 135) could alternatively be represented as an element within its won opening and closing tag pair, leading to an even greater amount of tag-related overhead.

The extensible tag syntax enables an XML document to be easily human-readable, as the tag names can be designed to convey the semantic meaning of the associated data values and the overall relationship among the elements of the data. For example, in FIG. 1 the tag names and structure explicitly show that a name includes a last name, a first name, and a middle initial. This human-friendly, well-structured format enables a human being to quickly look through an arbitrary XML document and understand the data and its meaning. However, it will take a computer quite a lot of effort to understand the data and do useful things with it. The raw content of most XML documents will never be seen by a human: instead, what the end user sees is typically created using a rendering application (such as an XML parser within a browser) which strips out the tags and displays only the embedded data content. The added overhead of the human-friendly tag syntax therefore leads to unnecessary inefficiencies in processing and storing structured documents when the documents will only be "seen" by a computer program, such as for those documents which are formatted for interchange between computer programs for business-to-business ("B2B") or business-to-consumer ("B2C") use. This is especially true when the XML document is destined for processing on a high-volume transaction server, where none of the processing steps is likely to require a human to see or understand the document tags. (The terms "extensible document" and "structured document" are used interchangeably herein unless otherwise stated.)

In the existing art, transformations on XML documents are performed by application of stylesheets or by customized programming operations. Both of these techniques have certain drawbacks. Customized code is application-specific, and therefore is expensive to provide (and to extend, when the content or format of the associated XML documents changes). While a stylesheet engine can process any syntactically valid stylesheet constructed by users, its performance overhead and the unpredictability of user stylesheet logic are major inhibitors for performing XML transformations in high-performance environments. The performance overhead, in particular, means that stylesheet engines cannot adequately handle transformations in high-volume or other throughput-sensitive environments such as those where B2B transaction servers are often found. The major factors for the performance overhead when using stylesheets, and the resulting inadequate performance, are threefold:

(1) The parser operating on the source document spends a considerable amount of effort understanding the content and meaning of the data from the XML format (as mentioned above). For example, it scans every tag thoroughly to figure out the information needed to construct a Document Object Model ("DOM") tree, upon which existing stylesheet engines operate. (DOM is published as a Recommendation of the W3C, titled "Document Object Model (DOM) Level 1 Specification, Version 1.0" (1998).)

(2) The internal data structures constructed to hold the DOM tree are not optimized for data manipulation and transformations. In the existing art, DOM trees are physically stored in a tree representation, using objects to represent the nodes in the tree, the attributes of the nodes, the values of the nodes, etc. Operations are then performed (e.g. by stylesheet processors) by operating upon this tree representation. For example, deleting elements from a document may be accomplished by pruning subtrees from the DOM tree; renaming elements within a document may be accomplished by traversing the objects of the DOM tree to find the occurrences of the element name, and substituting the new name into the appropriate nodes of the DOM tree.

Creation of a DOM tree is computationally expensive in terms of processing time and memory requirements. Using this tree-oriented DOM representation as an internal storage format requires a considerable amount of memory and/or storage space to store the required objects. In addition, a number of computer program instructions must be executed to allocate memory and create the objects, delete objects and de-allocate memory, and traverse the tree structure to perform operations thereon. Execution of these instructions increases the processing time required for structured documents, as do the operating system-invoked instructions which are periodically executed to perform garbage collection (whereby the space being used by objects can be reclaimed after the objects have been logically deleted or de-allocated).

(3) There is no distinction made by existing stylesheet engines between general matching situations requiring a "long" or complex transformation (such as formatting a list of nodes) and base manipulative transformations requiring a "short" or simple transformation (such as renaming a node). While the performance overhead of existing stylesheet engines may be justified when performing long transformations, applying the same transformation techniques to short transformations results in an excessive amount of overhead for those short transformations.

With the growing prevalence of structured documents in the B2B and B2C environments, and the increasing use of structured documents as the input and output transaction format for high-volume transaction servers, it is necessary to avoid processing inefficiencies such as these to the greatest extent possible.

Accordingly, what is needed is an improved technique for applying transformations to extensible documents, enabling reductions in the processing time required to transform arbitrarily-structured documents.

SUMMARY OF THE INVENTION

An object of the present invention is to provide an improved technique for applying transformations to extensible documents, enabling reductions in the processing time required to transform one well-defined document to another well-defined document.

It is another object of the present invention to provide this improved technique for documents specified in XML.

Another object of the present invention is to provide this improved technique for documents which have been stored internally using an array-based storage format.

Yet another object of the present invention is to provide this technique by directly manipulating the content of the array-based document information.

Still another object of the present invention is to provide a technique for manipulating arbitrarily-structured documents which has better performance characteristics as compared to existing stylesheet processors operating on DOM tree document representations.

A further object of the present invention is to provide a technique for optimizing performance of relatively short transformations on structured documents.

Another object of the present invention is to provide an improved transformation technique for structured documents which is independent of the transformation engine used.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for efficiently transforming extensible documents. The documents may be encoded in XML or in other notations such as a machine-oriented extensible document language. In one aspect of the preferred embodiment, this comprises: identifying a source document type; specifying one or more fast transformations to be performed on documents of the source document type; specifying a source node description and a target node description for each of the specified fast transformations; storing transformation information for each of the specified fast transformations, the transformation information comprising a transformation identifier, the source node description, and the target node description; and processing incoming source documents to generate output documents using the stored transformation information. Processing the incoming source documents further comprises: receiving a source document; selecting, manually or based upon a comparison of the received source document to the stored transformation information, zero or more fast transformations to be performed; applying the selected fast transformations; and generating one or more output documents as a result of those applications of the selected transformations.

The technique may further comprise parsing the received source document, or the received source document may already be in parsed form. Optionally, the received source document may be an array-based representation of an extensible document. In this case, applying the selected fast transformations preferably further comprises manipulating selected nodes by manipulating the array-based representation.

The source node description preferably identifies one or more source nodes in an input document of the source document type and the target node description preferably identifies zero or more target nodes in an output tree to be generated in the one or more output documents In another aspect of the preferred embodiment, this comprises: specifying fast transformations to be applied to incoming source documents; applying the fast transformations to particular incoming source documents matching criteria of the specified fast transformations; and applying general purpose transformations to incoming source documents not matching criteria of the specified fast transformations.

The general purpose transformation engine may be a stylesheet engine, such as an Extensible Stylesheet Language (XSL) engine.

Specifying the fast transformations may further comprise: identifying a source document type; specifying one or more fast transformations to be performed on documents of the source document type; specifying a source node description and a target node description for each of the specified fast transformations; and storing transformation information for each of the specified fast transformations, the transformation information comprising a transformation identifier, the source node description, and the target node description. In this case, applying the fast transformations preferably further comprises: receiving a source document; selecting, manually or based upon a comparison of the received source document to the stored transformation information, zero or more fast transformations to be performed; and applying the selected fast transformations by manipulating selected nodes of the received source document according to the selected fast transformations.

The technique may further comprise parsing the received source document, or the received source document may already be in parsed form. Optionally, the received source document may be an array-based representation of an extensible document. In this case, applying the selected fast transformations by manipulating selected nodes preferably further comprises manipulating the array-based representation.

In this aspect, the source node description preferably identifies one or more source nodes in an input document of the source document type and the target node description preferably identifies zero or more target nodes in an output tree to be generated in the one or more output documents, and the general purpose transformation engine is preferably a stylesheet engine such as an XSL engine.

In either aspect, one or more templates may be preloaded as part of the fast transformation process. The source document and/or the output document may be represented as in-memory structures, which may be produced by or sent to another software process.

The present invention will now be described with reference to the following drawings, in which like reference numbers denote the same element throughout.

BRIEF DESCRIPTION OF THE DRAWINGS

FIG. 1 illustrates a simple example of an XML document using the XML notation of the prior art;

FIGS. 4A and 4B illustrate a simple structured document created in the existing XML notation, and a tree structure representing this prior art XML document, respectively;

FIG. 4C depicts a structured document represented in mXML notation, according to a preferred embodiment of the first related invention, where this mXML document conveys an equivalent structure and equivalent document content as the XML document in FIG. 4A;

FIGS. 5A through 5E illustrate examples of arrays that may be created, according to a preferred embodiment of the second related invention, to store the structure and content information of prior art structured documents such as XML documents and/or mXML documents;

FIGS. 7 through 14 provide flowcharts which set forth the logic which may be used to implement a preferred embodiment of the present invention, as well as examples used to illustrate those flowcharts.

DESCRIPTION OF THE PREFERRED EMBODIMENT

Figure 2:
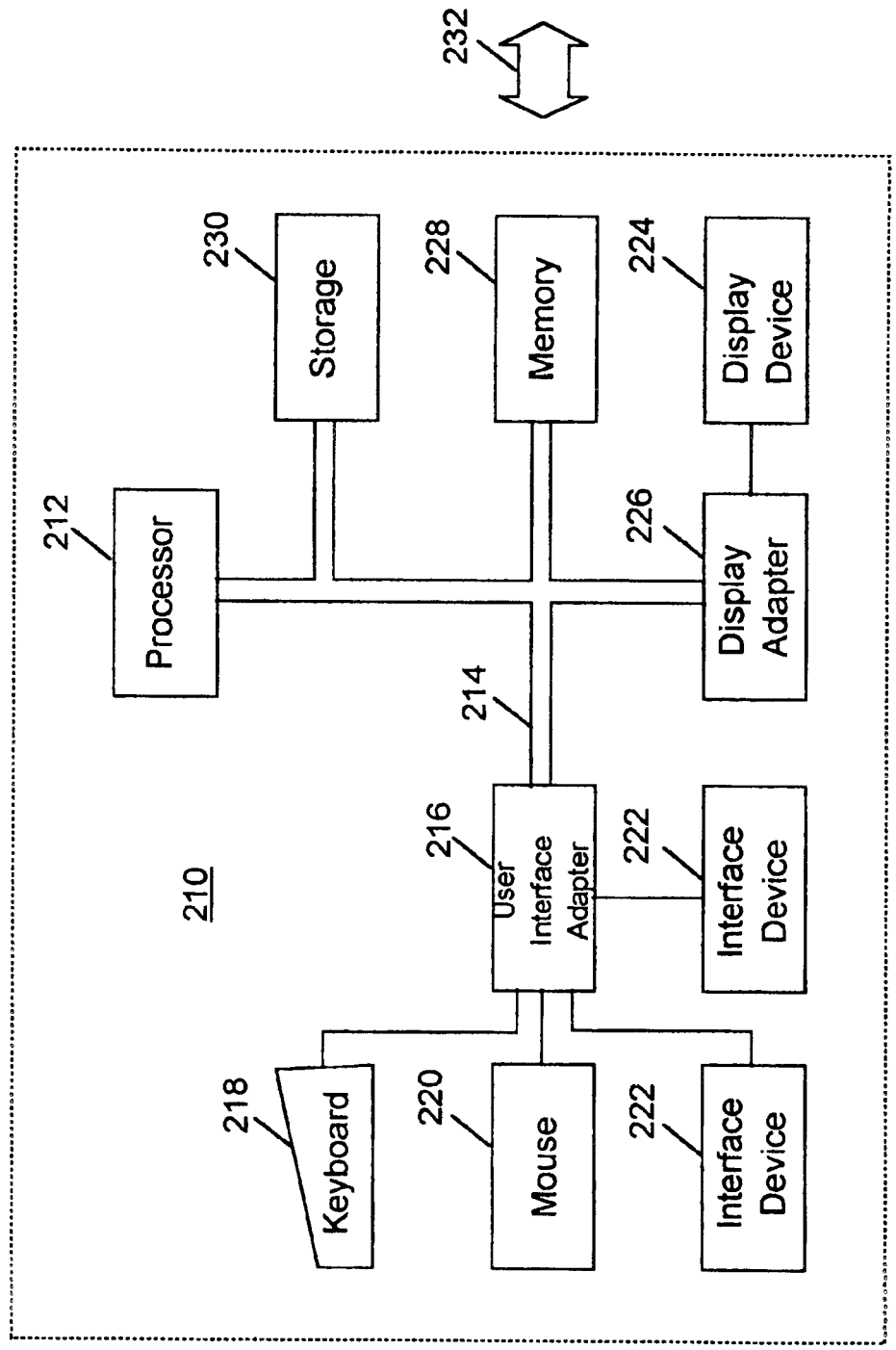
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a LAN or a wide area network (WAN), or the workstation 210 can be a client in a client/server arrangement with another computer, etc. All of these configurations, as well as the appropriate communications hardware and software, are known in the art.

The present invention may operate on a server or mainframe (referred to hereinafter as a server, for ease of reference), rather than on a workstation. The hardware environment of a server is well known in the art. Or, the present invention may operate on other computing devices such as personal digital assistants (PDAs), portable computing devices, etc. The transformed documents resulting from use of the present invention may be stored on permanent or removable storage media used by a computing device, and/or may be transmitted between such a device and a server, or between a server and another server where these types of devices may be connected by a network.

Figure 3:
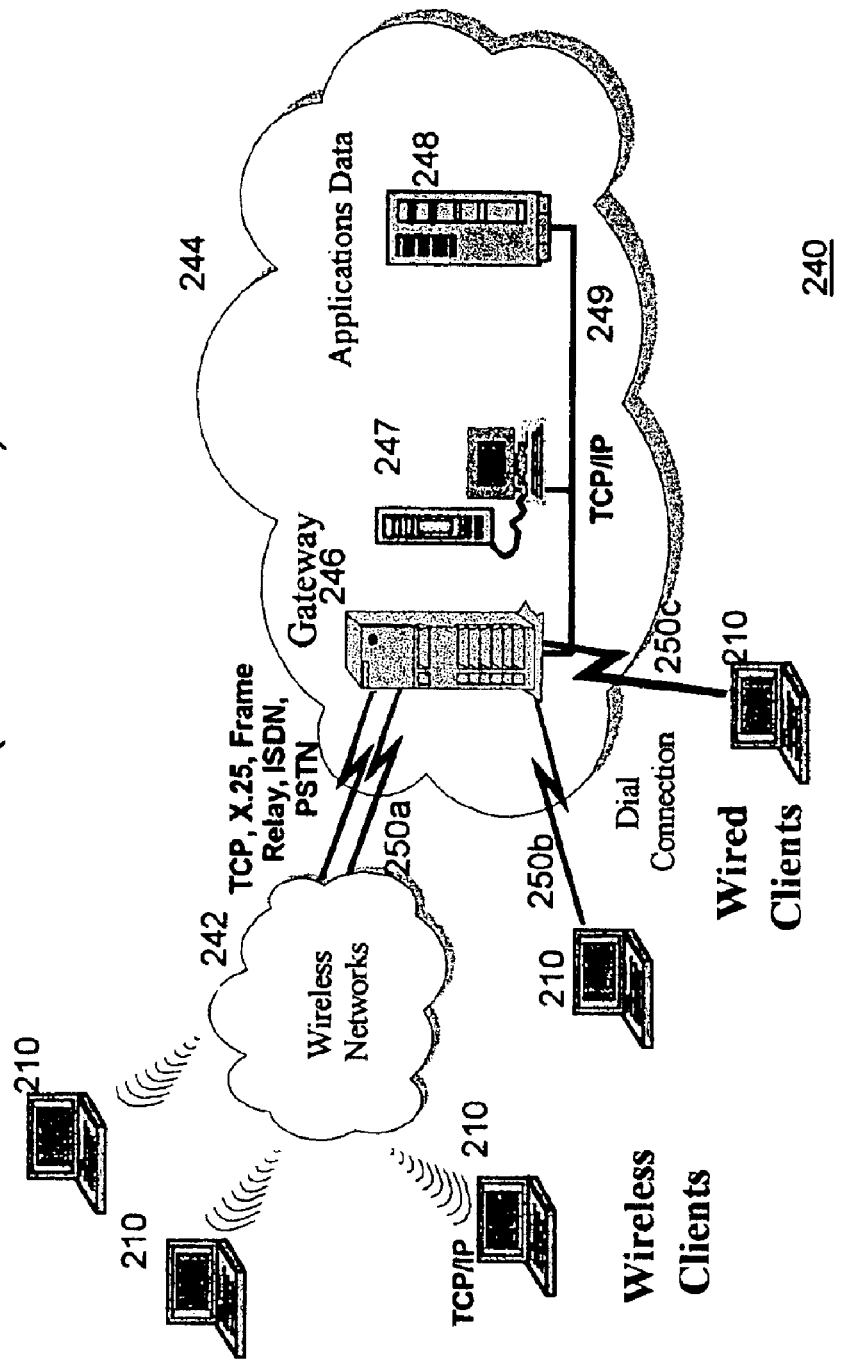
FIG. 3 is a diagram of a networked computing environment in which the present invention may be practiced.

FIG. 3 illustrates a data processing network 240 in which the present invention may be practiced. The data processing network 240 may include a plurality of individual networks, such as wireless network 242 and network 244, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 242 and 244 may also include mainframe computers or servers, such as a gateway computer 246 or application server 247 (which may access a data repository 248). A gateway computer 246 serves as a point of entry into each network 244. The gateway 246 may be preferably coupled to another network 242 by means of a communications link 250a. The gateway 246 may also be directly coupled to one or more workstations 210 using a communications link 250b, 250c. The gateway computer 246 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 246 may also be coupled 249 to a storage device (such as data repository 248). Further, the gateway 246 may be directly or indirectly coupled to one or more workstations 210, and servers such as gateway 246 and application server 247 may be coupled to other servers such as server 243.

Those skilled in the art will appreciate that the gateway computer 246 may be located a great geographic distance from the network 242, and similarly, the workstations 210 may be located a substantial distance from the networks 242 and 244. For example, the network 242 may be located in California, while the gateway 246 may be located in Texas, and one or more of the workstations 210 may be located in New York. The workstations 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 246 using dial connections 250b or 250c. Further, the wireless network 242 and network 244 may connect to one or more other networks (not shown), in an analogous manner to that depicted in FIG. 3.

Software programming code which embodies the present invention is typically accessed by the microprocessor 212 (for example, of the workstation 210, server 243, gateway 246, and/or server 247) from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

The present invention may be used on a client computer or server in a networking environment, or on a standalone workstation (for example, to process a document which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc, having processing (and, optionally, communication) capabilities. The server, similarly, can be one of any number of different types of computer which have processing and communication capabilities. These techniques are well known in the art, and the hardware devices and software which enable their use are readily available.

In the preferred embodiment, the present invention is implemented in computer software. The implementation of this software may operate as one or more modules (also referred to as code subroutines, or "objects" in object-oriented programming) of one or more computer programs.

The present invention provides an improved, high-performance technique for transforming structured document content from Extensible Markup Language (XML) source documents, or source documents encoded in other notations such as mXML. (The preferred embodiment is described herein terms of the source document used with the present invention being an XML document or mXML document.) This high-performance transformation technique is designed to be significantly more efficient, and operate more quickly, than the stylesheet engines of the prior art, while still providing a technique for performing the long transformations to which stylesheet engines are well suited. In particular, the high-performance transformation technique operates very efficiently and quickly on short or simple document transformations (referred to equivalently herein as "fast transformations"). Preferably, a set of well-defined operations is identified for use with a particular implementation of the present invention, where those operations in the set are needed in the particular high-performance transformation environment. (One example of an operation set containing 10 transformation operations is provided herein for purposes of illustration.)

According to the present invention, relatively short transformations on structured documents are performed by a process (referred to herein as a special purpose transformation engine or "map-based" engine) which is optimized for this purpose. A structured document (or memory or storage representation thereof) can be transformed through a set of predefined operations. These "short" transformations are performed as direct array manipulations (which can be processed very efficiently, for example as in-memory calls). Long or more complex transformations are processed using stylesheet engines (or perhaps custom-written code) as in the prior art. This use of one process for short transformations and another for long transformations is in contrast to prior art processing, which uses a high-overhead stylesheet processor for both short and long transformations.

By using the techniques of the present invention, the overall processing time for transforming selected structured documents can be reduced. This technique enables transformations in high-performance environments, such as B2B transaction servers, to be performed much more efficiently and much more quickly. The applications written by developers are not required to be changed to take advantage of the present invention, and will continue to function properly without regard to which transformation engine (i.e. the map-based engine used to process the short transformations of the present invention, or a conventional stylesheet engine used to process the long transformation according to the prior art) is used.

Preferably, the efficient array-based storage disclosed in the second related invention is used in combination with the present invention, in order to achieve further efficiencies in high-performance XML transformations. For example, one short transformation that may be used with the present invention is renaming of an element. Using the array-based representation of the second related invention, the element renaming operation can be performed in one (preferably sequential) pass through the element name array. While the transformation techniques of the present invention may be used with DOM tree representations created according to the prior art, using a DOM tree object structure representation rather than the array-based representation to perform the renaming operation requires traversing an entire DOM tree from object to object to achieve the same result.

The present invention may also be used in combination with both the first and second related inventions, yielding an even more efficient overall transformation process.

With more and more application programs being written to operate upon XML documents, the improvements yielded by this high-performance transformation technique will have a significant impact. (The high-performance transformation technique disclosed herein may also be used advantageously for transforming documents that have been encoded in other structured document notations, and thus references herein to using the transformation technique of the present invention for XML and mXML documents are intended for purposes of illustration and not of limitation.)

The preferred embodiment of the present invention will now be described in more detail with reference to FIGS. 4 through 15.

Figure 4B:
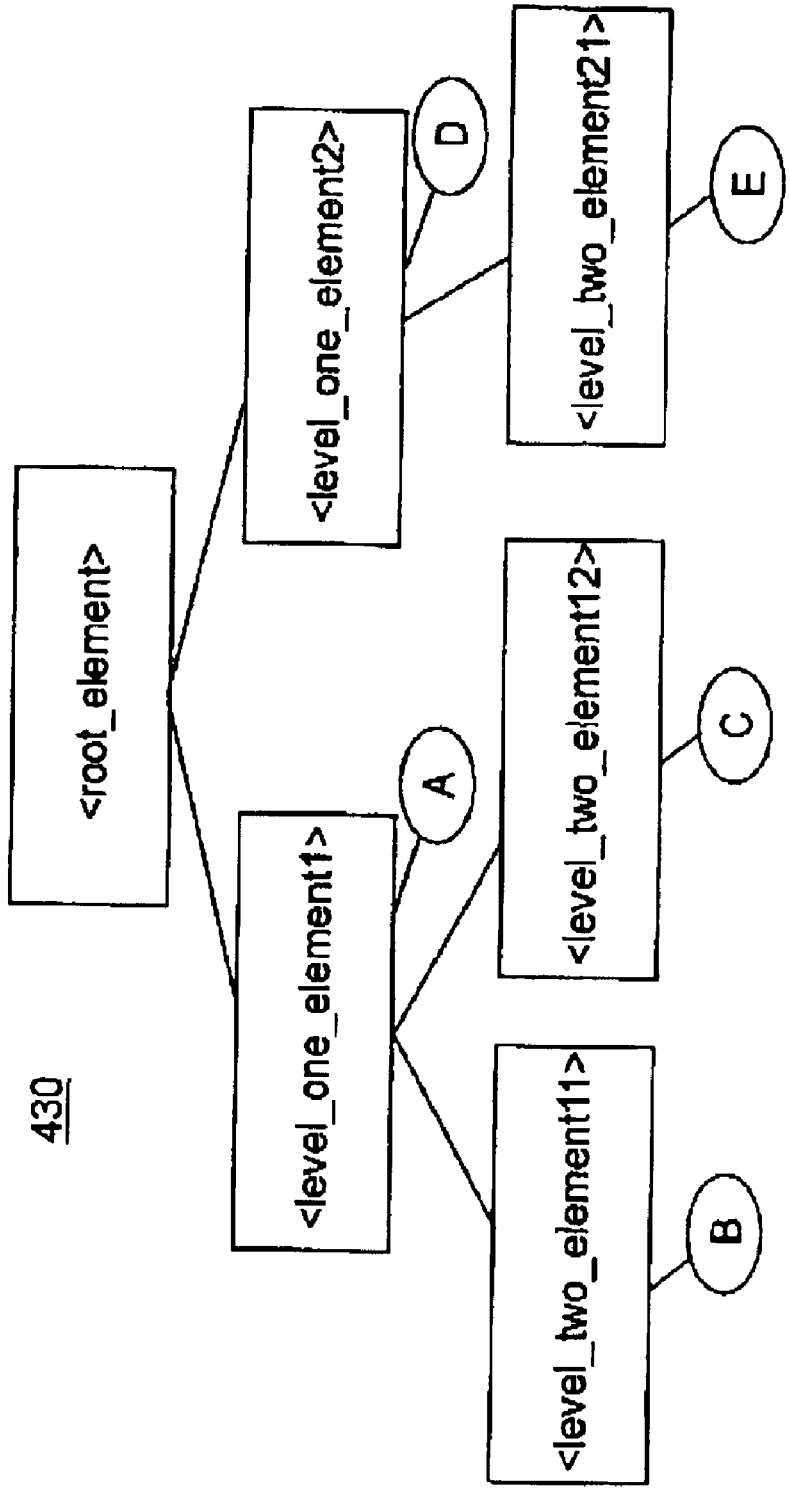
Figure 5C:
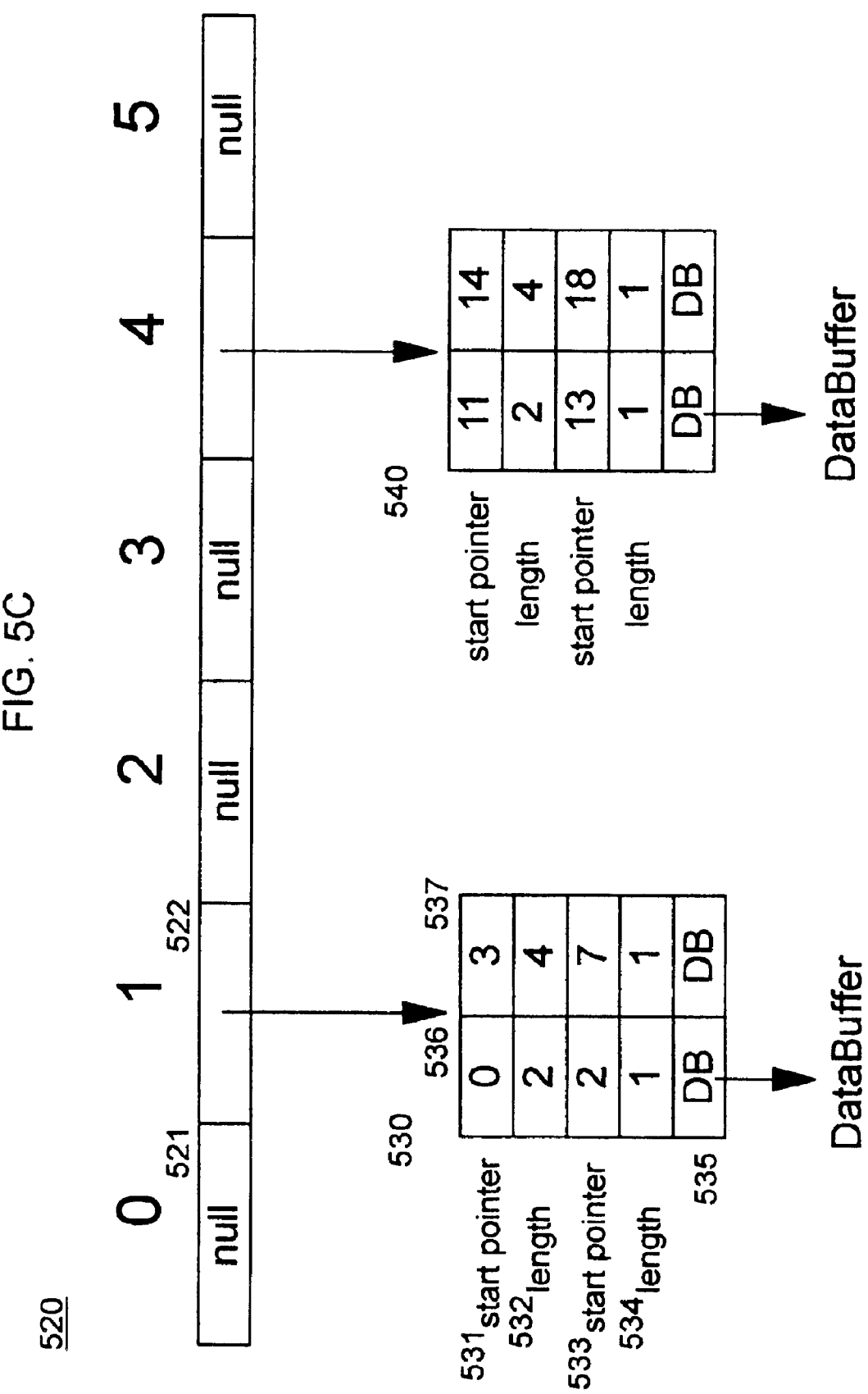
Figure 5D:
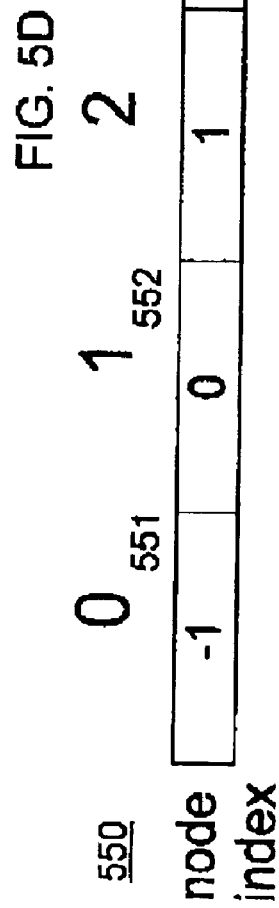
Figure 5E:
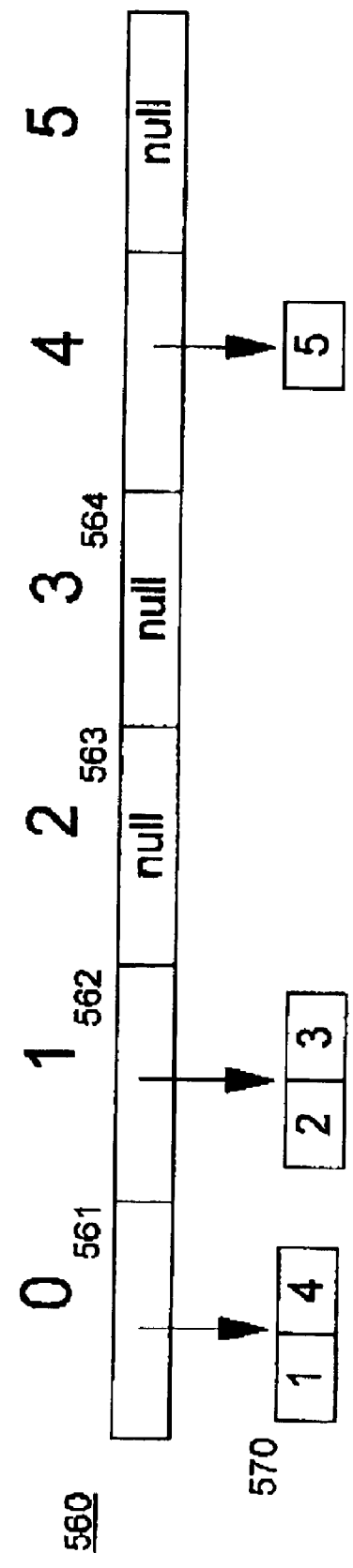

FIG. 4A illustrates a simple structured document 400 which is represented in the existing XML notation. This document contains 6 elements which are organized in a 3-level hierarchy. The node having element name "root_element" 402 is the root node, being at the highest level of the hierarchy. This node has 2 child nodes, having element names "level_one_element" 410 and "level_one_element2" 420. Node "level_one_element" 410 also has 2 child nodes, which are the nodes having element names "level_two_element11" 412 and "level_two_element12" 414, and node "level_one_element2" 420 has a single child node having element name "level_two_element21" 422. A tree structure 430 representing document 400 is shown in FIG. 4B, where the tags for the 6 elements are depicted inside rectangular shapes representing nodes of the tree and the data content corresponding to each node is shown inside an ellipse. This interpretation of an XML document 400 and its corresponding tree structure 430 are well known in the art.

FIG. 4C illustrates a structured document 460 using a preferred embodiment of the syntax of the mXML notation, as has been described in detail in the first related invention. This mXML document represents the same information as XML document 400 of FIG. 4A, and has the same logical tree structure as that shown graphically at 430 in FIG. 4B. Advantages of using mXML for extensible document representation have been discussed in detail in the first related invention, and will not be repeated here.

To operate on the DOM tree storage format shown in FIG. 4B according to the prior art, tree traversal operations are performed. For example, if a stylesheet specifies that all occurrences of the text string "level_one" within element names of a structured document are to be replaced by the characters "H1", then all the nodes of the tree must be traversed to inspect their element names searching for the target string. While the example DOM tree contains only 6 nodes at 3 different levels, one of skill in the art will readily recognize that DOM trees for actual documents may contain hundreds or even thousands of nodes and may be nested many levels deep. Thus, in the general case a node-by-node traversal is a very expensive process. (The terms "elements" and "nodes" are used interchangeably herein to refer to elements of a structured document and their corresponding nodes in a tree-structured representation thereof.)

FIGS. 5A through 5E provide an example of using an array-based storage format as an alternative to a DOM tree representation, according to the preferred embodiment of the second related invention. These example arrays represent the information from XML document 400 of FIG. 4A, and equivalently from mXML document 460 of FIG. 4C. These arrays provide a much more efficient storage format than the DOM tree 430 of FIG. 4B, with no loss of information content. Creating and accessing the arrays also requires less processing time as contrasted to DOM tree processing and results in significantly more efficient memory management.

The arrays used in the preferred embodiment of the second related invention comprise: (1) an element name array (see FIG. 5A); (2) an element value array (see FIG. 5B); (3) an attribute array (see FIG. 5C); (4) a parent array (see FIG. 5D); and (5) a children list array (see FIG. 5E).

These arrays have been discussed in detail in the second related invention. Reference may be made to that description form more information about the structure and contents of the arrays, as well as a discussion of alternative array formats that may be used, other node types that be supported, and so forth. In an alternative embodiment of the second related invention wherein the array-based structures are used to support documents encoded in a source document notation that does not use attributes, the attribute array depicted in FIG. 5C may be omitted. (An example of such a notation is the XML subset referred to in the technical community as "SML", for "Simple Markup Language". The XML notation includes a number of notational elements which are not strictly necessary for data-centered document specification. SML is therefore being proposed as a notation that uses a core set of XML syntax, and omits features including attributes, processing instructions, etc.)

Note that while the preferred embodiments refers to storing the arrays in memory, an alternative implementation may store the arrays using a storage medium such as disk storage. References to use of memory are therefore intended for purposes of illustration and not of limitation.

Figure 6:
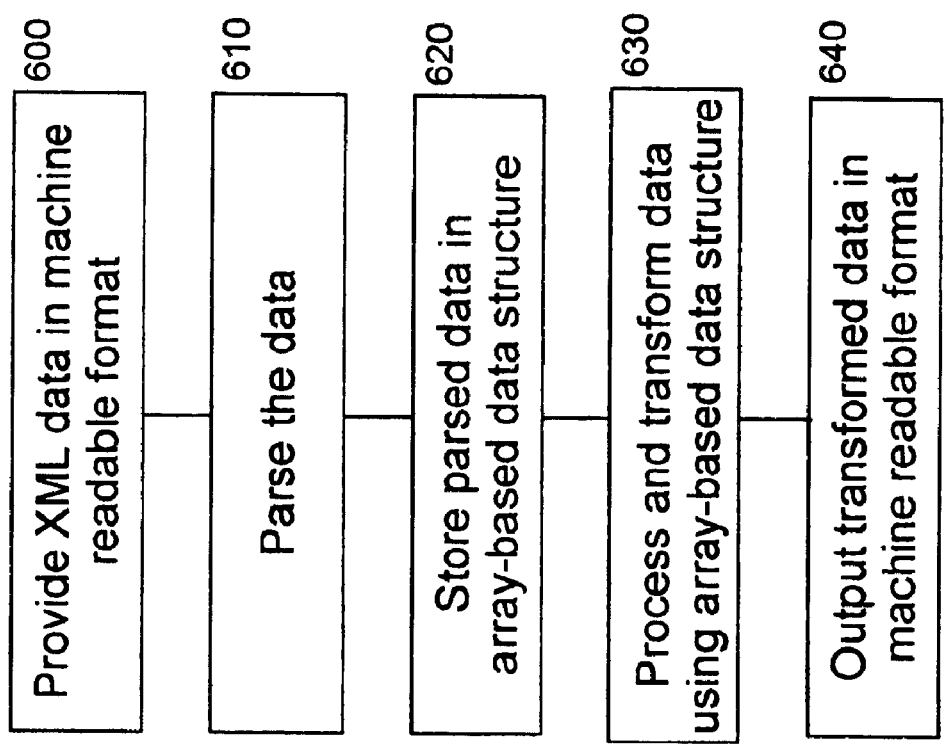
FIG. 6 provides a flowchart which illustrates an overview of processing steps that may be used when the first related invention and second related invention are used in combination with the present invention.

The flowchart in FIG. 6 provides an overview of processing steps that may be used when the first related invention and second related invention are used in combination with the present invention. (Alternatively, the advantages of the present invention may be realized when it is used with only the second related invention, and also when it is used without either of the two related inventions). As shown in Block 600, a source document is provided in the machine-readable mXML format defined in the first related invention. (Alternatively, a source document in another notation may be used). This source document is then parsed (Block 610), and the data resulting from the parsing process is stored using the array-based structure of the second related invention (Block 620). The information in the array-based structure may then be processed using the high-performance transformation technique disclosed herein (Block 630), as will be described in more detail herein. The result of the transformation may then be output as an mXML document (Block 640) using the notation as disclosed in the first related invention. Alternatively, the result of Block 630 may be written out in another form, including as a conventional XML document, if needed.

In a particular computing environment, the short transformations which typically need to be performed on elements of a structured input document form a core set. For example, typical short transformations may include deleting, adding, copying, moving, filtering, reordering, renaming, and merging elements; converting elements to attributes; and converting attributes to elements. These 10 operations form one core set that is used herein for the preferred embodiment of the present invention; however, fewer, additional, or different short transformations may be used alternatively without deviating from the inventive concepts disclosed herein. These 10 short transformations will now be described in more detail:

Delete: delete selected nodes (or perhaps node attributes), which is performed easily using the new data structure by adjusting the child (or attribute) list.

Add: add selected nodes, which requires a bit more work than deletion since memory must be dynamically allocated to store the new node information in the arrays, and the arrays are not automatically extensible. (As is well known in the art, one way to "extend" an array is to create a new array when necessary. Then the set of arrays can be viewed as virtually a single array. Or, an existing array with pre-allocated unused slots at its end may have valid entries beyond the point of insertion shifted over the unused pre-allocated elements to make room for inserted entries, and conversely, may have valid entries beyond the point of deletion shifted over the deleted entries, creating additional unused entries at its end).

Copy: copy selected nodes, including their children, from the source document to the target document.

Move: move selected nodes, including their children, from the source document to the target document.

Filter: separate the source document into multiple target documents by copying selected nodes and their children (or selected ones of their children) over to different ones of the targets.

Reorder: reorder the sequence of children for a node.

Rename: rename nodes.

Merge: merge selected nodes from multiple source documents into one target document.

Convert E2A: convert selected nodes (element) into attributes of other nodes.

Convert A2E: convert attributes of selected nodes into new nodes.

The high-performance transformations provided by the present invention are described through one or more "maps". According to the preferred embodiment, a map is a syntax element which may be expressed as an element in an XML document (or an Extensible Stylesheet Language Transformations, or "XSLT", stylesheet). The map provides a precise description of the transformation operation to be performed, the source node(s) to be operated upon by this transformation, and the target location in the output document where the result of the transformation should be place. (The map definitions may be converted into mXML notation and stored for more efficient processing, if desired.)

Each map element has an attribute which is used to specify the operation code of the map. The values of this attribute are preferably keywords from a predetermined set corresponding to the set of transformations supported. For example, the attribute values for the above-described set of 10 transformation operations may be "DELETE", "ADD", "COPY", "MOVE", "FILTER", "REORDER", "RENAME", "MERGE", "E2A", and "A2E".

FIG. 7 provides an example of a map 700 that may be used to rename a node in a document. Suppose that the source document is the set of names shown in FIG. 1. For a particular business application, it may be desirable to replace the element name "LAST_NAME" (see 105, 110, 130, 140) with the elements name "SURNAME" when creating an output document. Thus, this example map 700 specifies to search for nodes having this LAST_NAME element name and—using the short transformation of the present invention—renames those nodes when creating the output document. As shown in this example, the attribute named "opcode" 705 has a value of "RENAME" 710 and a parameter 715 which includes a source node 720 and a target node 740. The element name to be replaced is identified within the source tag pair 720, 735 by providing, as the value of a "tag" attribute 725 on an XMLDATA tag, the name 730 of the element in the source document. A target node tag pair 740, 750 is provided to specify a target for the map operation. A child node having the element name "tag" identifies the element name 745 to use to output document.

A particular implementation of the present invention may be adapted to process the map syntax according to the needs of the environment in which the high-speed transformation will operate. For example, the transformation operation specified by the map element in FIG. 7 may be implemented such that it renames only the first occurrence of the matching node name; alternatively, the entire name array may be searched, and each node having a matching node name may be renamed.

Note that FIG. 7 presents merely one simple example of the syntax that may be used to specify a map. Alternative syntax may be used without deviating from the inventive concepts disclosed herein. FIG. 8 provides a definition of map syntax that may be used with the present invention, where this definition is expressed in Document type Definition ("DTD") form, the interpretation of which will be obvious to one of skill in the art. As shown therein, additional information to be used in locating a source node and a target node (such as the node's relative location within the document structure, information about the node's ancestors, etc.) may also be specified. The preferred embodiment of this syntax provides for explicitly defining the scope of a transformation through use of the "level" attribute of the XMLDATA tag, wherein a value of 0 indicates that the transformation applies to all levels of the document hierarchy. (The syntax in FIG. 8 is also provided in Appendix A, along with descriptive commentary to more fully explain the syntax elements. Appendix B provides the syntax which is preferably used for signature specification.)

Optionally, short transformations may be grouped or aggregated together to perform more complex transformations. In this case, each transformation in the group is specified by a map. FIG. 9 presents an example of an aggregated transformation. In this example, the source document 900 is an order document comprised of elements representing internal and external purchase orders. The "splitOrders" operation 905 is to be performed by (1) deleting 910 an element having the name "log" at the fourth level of the document hierarchy (see 915); and (2) filtering 920 elements of the source document according to a set of parameters. In this example, the elements having the tag name "Item" at the fourth level of the document hierarchy (see 925) are evaluated by the map-processing engine to determine whether their description is "tv-19" or "vcr" (see 920). If so, then these elements from the source document are attached to the output document named "externalPOs" (see 935) using the tag "externalPurchaseOrders" as their parent (see 940, 945); otherwise (see 950); they are attached to the output document named "internalPOs" (see 955) using the tag "internalPurchaseOrders" as their parent (see 960, 965). (This example corresponds to the situation in which terms described as "tv-19" and "vcr" are ordered using an external purchase order, while internal purchase orders are used for all other items.)

Figure 10:
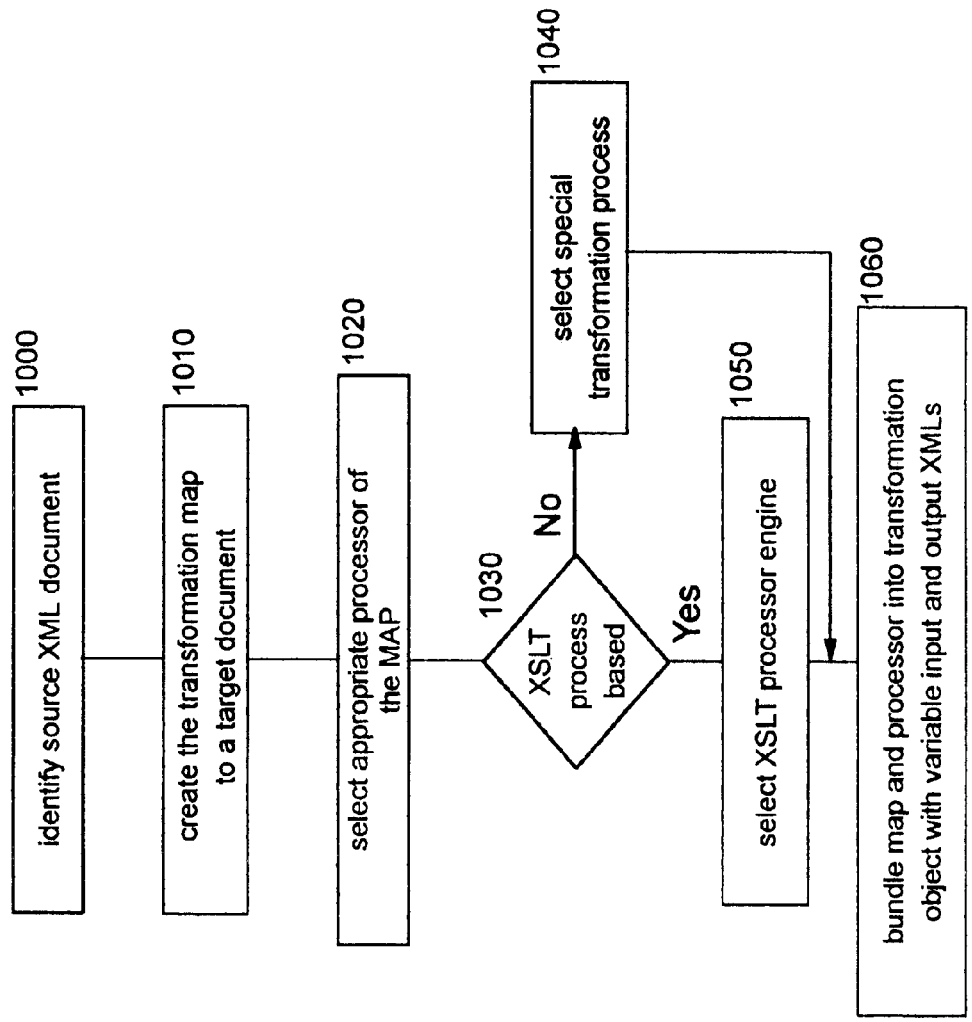

FIG. 10 provides a flowchart which illustrates a preferred embodiment of the logic that may be used at development time to prepare for use of high-speed transformations of the present invention. At Block 1000, an identification of a source XML document type is created. This comprises creating a signature for the source document type, wherein one or more tags and attributes (and relationships among tags) that can be used to identify occurrences of this document type are defined. Preferably, this signature is defined using a partial DTD (or similar syntax) for the document type (that is, by selecting some of the tags and attributes from a DTD that will be used as the basis to compare with an actual document for a match). For example, a signature for the document of FIG. 1 might be composed as <!ELEMENT NAME (LAST_NAME, FIRST_NAME, MIDDLE_INITIAL?)> <!ATTLIST LAST_NAME SUFFIX CDATE #IMPLIED> which specified that the NAME element has children elements of LAST_NAME, FIRST_NAME, and optionally MIDDLE_INITIAL, and that the LAST_NAME element has an optical attribute named SUFFIX.

The transformation map or maps which will transform documents of the type identified at Block 1000 are then created at Block 1010, where those transformation maps preferably have a syntax such as that described above with reference to FIGS. 7 through 9 (and as shown in more detail in Appendix A). These transformation maps may be created with a simple text editor, or with an automated tool that is adapted to creation of structured document content: the particular tool used to create the maps does not form part of the present invention.

The appropriate processor to be used for processing the map is then identified (Block 1020). In the preferred embodiment, this comprises determining whether the map-based transformation is to be performed by (1) an in-line high-speed transformation of the type disclosed herein; or (2) a stylesheet which uses prior art techniques. The test Block 1030 asks whether the choice was to use a stylesheet. If so, then a flag is set (Block 1050) indicating that this transformation is a stylesheet transformation, and a name or other identifier of the stylesheet is provided. Otherwise, a flag is set (Block 1040) saying that the transformation is a special map-based in-line transformation, and a name or other identifier of the map is provided. (Alternatively, the transformation processing can be performed by custom-written logic. It will be obvious how the flowchart in FIG. 10 can be modified to account for this additional alternative). In either case, control then reaches Block 1060 where a bundler is created comprising the map(s) from Block 1010, the processor information from Block 1040 or 1050, and the signature information from Block 1000. This bundle is preferably stored as a transformation object (such as a Java Bean), and is stored on persistent storage with other transformation objects (e.g. in a directory or database) for later use. Preferably, the signature created in Block 1000 is used as a key or index when storing the bundle, enabling it to be quickly located later (as will be described with reference to Block 1110).

Figure 11:
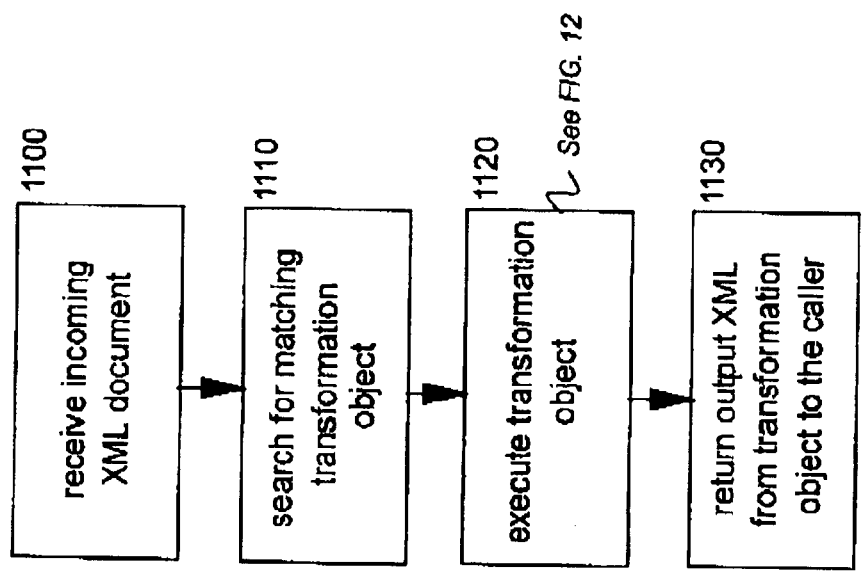

FIG. 11 depicts an overview of the processing that occurs when an arbitrary incoming document arrives at run time, and is to be transformed. At Block 1100, an incoming document, which in the preferred embodiment is an XML document, arrives. In Block 1110, this document is programmatically scanned and compared to the signatures which have been previously created using the logic in FIG. 10, thereby determining whether this document contains any of the predetermined well-defined elements that are suitable for short transformations. Because a signature typically represents only a subset of the tags in a source document type, it is possible that no matching signature is found (in which case the processing of FIG. 11 ends, and an error condition is preferably returned to the caller), or that more than one matching signature is found. In the latter case, a conflict resolution technique which is suitable to the needs of a particular environment may be used to select from among the transformation objects. When both short and long transformations apply, the short transformations preferably take precedence over the long transformations. If multiple short transformations apply, then a technique for selecting among those is used. For example, the signature having the most matching elements (which is therefore more precise match) may be preferred. Or, elements may be weighted, such that the signature with the highest weights is selected. As another alternative, explicit priority values may be set by the creators of signatures, in which case the matching signature with the highest priority is selected. Or, dynamic conditions such as the time of day or processing load might influence the selection. Many other conflict resolution techniques can be imagined.

Assuming a matching signature is located at Block 1110, the corresponding transformation object is then executed (Block 1120) to perform the desired transformation. The caller could specify a specific signature to speed up the match processing or resolve conflicts. If the caller knows what transformation to apply (i.e. XSLT or map), it can also specify this explicitly with a generic processing object. (This process will be described in more detail with reference to FIGS. 12 and 13.) Upon finishing the transformation, the resulting output document is returned to the caller (Block 1130).

Figure 12:
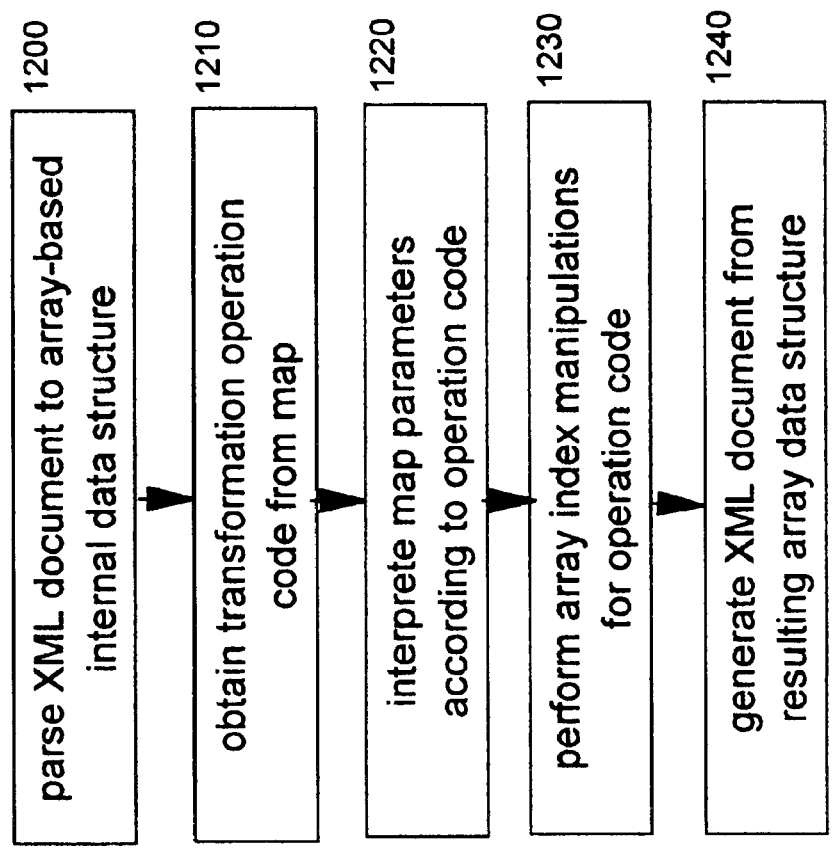

FIG. 12 illustrates a preferred embodiment of the logic that may be used to execute a transformation object, and expands on the level of detail for Block 1120 of FIG. 11. At Block 1200, the incoming document is preferably parsed to create an array-based representation thereof, as described in the second related invention. (Note that Block 1200 roughly corresponds to Blocks 600 through 620 of FIG. 6, Blocks 1210 through 1230 corresponds to Block 630, and Block 1240 corresponds to Block 640.) The transformation operation code is then retrieved (Block 1210) from the map in the transformation object that was located in the matching process of Block 1110. The parameters from this map are retrieved (Block 1220) and interpreted according to the operation code. For example, if the operation code is "RENAME" as in the example of FIG. 7, then the source node tag specifies the element that is to be renamed and the target node tag specifies the name to be used as the result. If the operation code is "DELETE", on the other hand (see 910 FIG. 9), then the source node tag specifies the element to be deleted and the target node tag should be empty.

Depending on the operation code, array index manipulations are performed (Block 1230) to carry out the corresponding short transformation. As one example, in the case where the operation code is "RENAME", the processing of Block 1230 comprise searching the element name array (see FIG. 5A) until locating an element having the name specified in the source node tag, and changing the contents pointed to by the element name array entry to be the name specified in the target node tag. It may be necessary to adjust the starting offset, length, and/or buffer pointer values (see 501, 502, 503 of FIG. 5A) as part of this process. For example, if the new name is shorter than the old name, the new name can be written in place over the old name. In this case, the starting offset does not need to changed, but the length pointer must be set to the new name length. Or, if the new name is longer than the old name, it may be necessary to stored the name at a new offset within the buffer pointed to by pointer 503, where the starting offset must then be set to point to a new position within this buffer. Or, it may be desirable to use space from a different buffer area altogether, in which case the value of the buffer pointer 503 must be set to point to this new buffer, and the starting offset 501 and length 502 then represent the storage locations used within that buffer.

As another example of the processing of Block 1230, suppose the operation code calls for deleting an element from the input document, or perhaps for deleting an attribute. The logic which may be used to implement these transformations is discussed below with reference to FIGS. 14B and 14C, respectively.

Once the array manipulations have been completed, Block 1240 generates an output document using the revised array contents, where this output document is preferably encoded in the XML syntax of the prior art. This output document is then returned to the caller when control returns to the mainline processing of FIG. 11.

Figure 13:
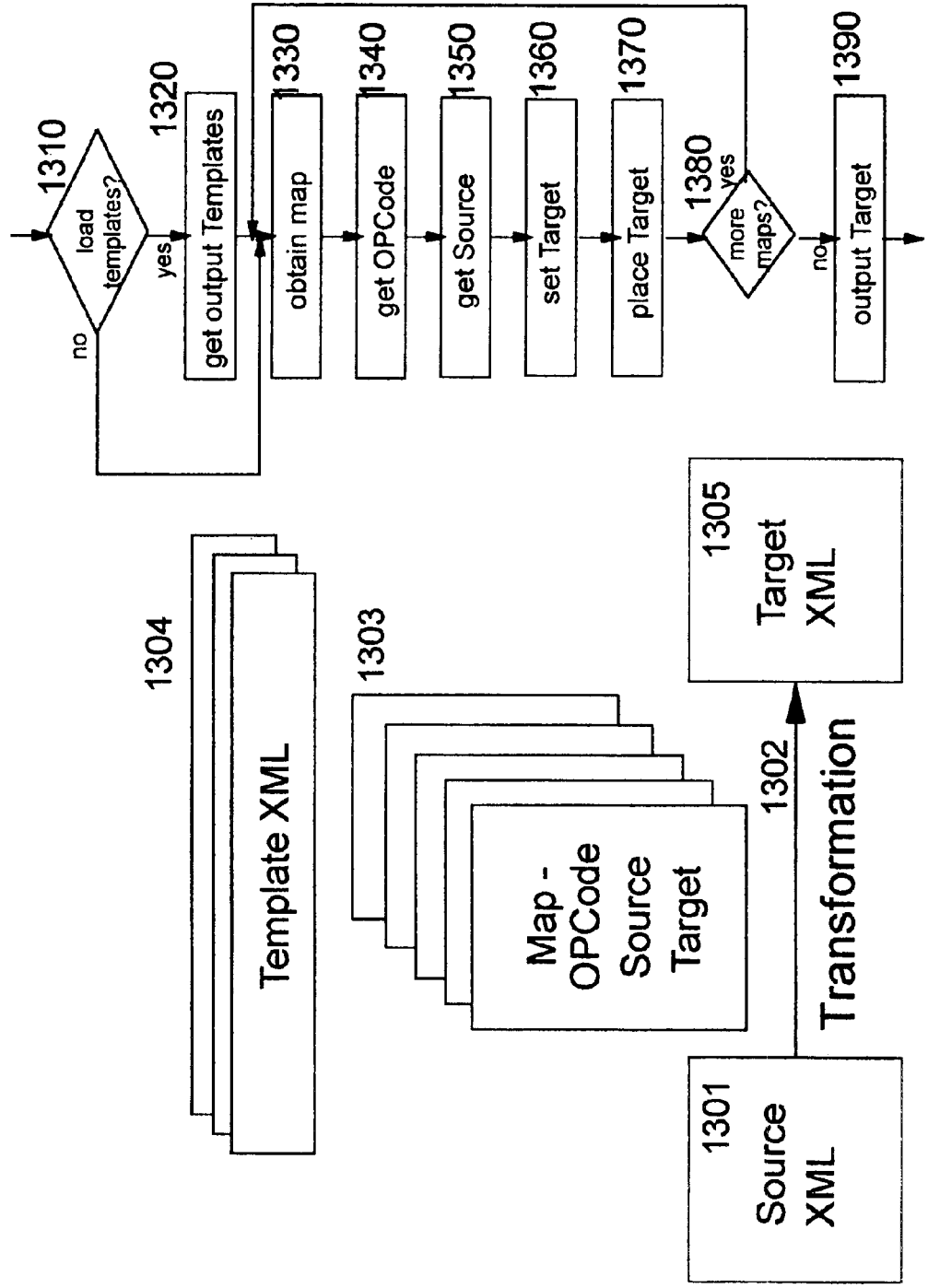

The present invention allows for output templates to optionally be used during the transformation process to automatically generate (i.e. preload) portions thereof. The map transformation processing with which this may be implemented is depicted in FIG. 13. (Although not shown in FIG. 13, the source document must be parsed, and preferably the array-based structures of the second related invention are created as well. Thus, the logic of FIG. 13 is an alternative to the logic in Blocks 1210 through 1240 of FIG. 12.)

As shown on the left side of FIG. 13, a transformation 1302 from a source XML document 1301 to target XML document 1305 comprises applying one or more maps 1303 and using one or more optional templates 1304. The processing begins at Block 1310 by asking whether any templates are to be loaded. Preferably, when templates are supported, the transformation object bundle created according to FIG. 10 includes an identification of the templates. If the test at Block 1310 has a positive result, then the identified templates are obtained (Block 1320), and a copy thereof is used for initializing the output document. Block 1330 then obtains the map from the proper transformation object (preferably using a signature to locate a matching object, as described above with reference to Block 1110 of FIG. 11), and Block 1340 locates the operation code within the map. The map operation code determines the transformation logic to be performed, such as ADD or COPY. Blocks 1350, 1360, and 1370 operate to process the source and target parameters from the map, as described above with reference to Blocks 1210 and 1220 of FIG. 12. The target node is set from the source node and placed in the output document according to information specified in an anchor tag within the target (see 960 of FIG. 9 for an example). Block 1380 asks whether there are more maps to be applied. If so, control returns to Block 1330 to begin processing the next map, otherwise, the target document is used as the output of the transformation process (Block 1390), and the processing of FIG. 13 ends.

Figure 14C:
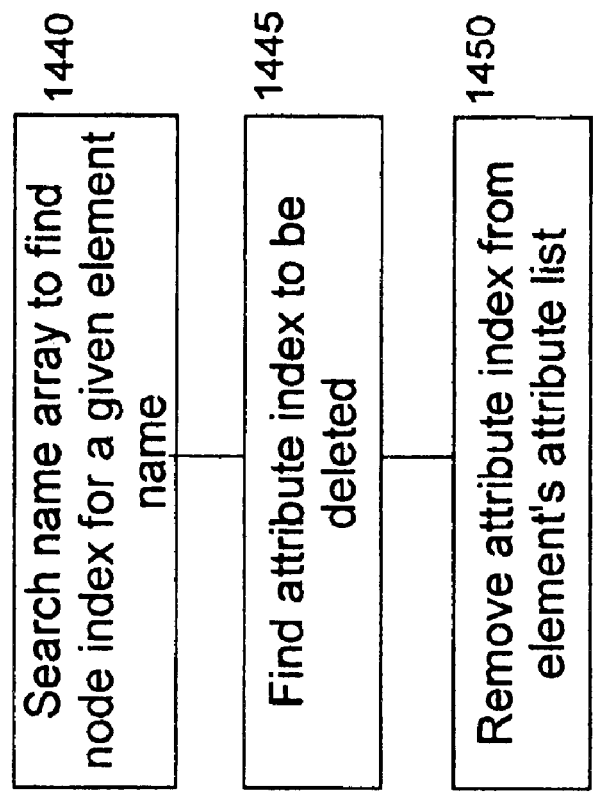
Figure 14B:
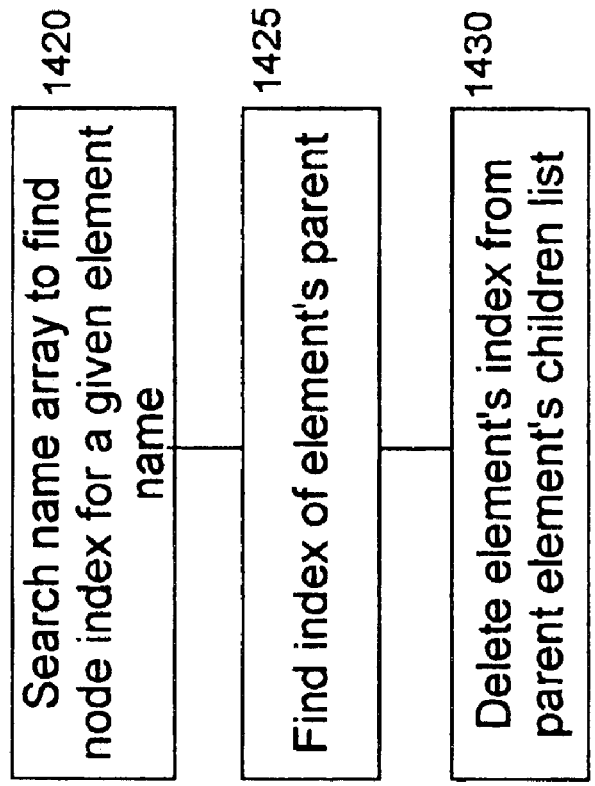

The flowcharts of FIGS. 14A through 14C provide examples of the logic which may be used to efficiently perform short transformations upon a structured document by operating upon the corresponding array-based storage representation thereof, according to preferred embodiment of the present invention. When used with the preferred embodiment of the present invention, the logic of these flowcharts is preferably invoked from Block 1230 of FIG. 12.

FIG. 14A depicts a preferred embodiment of a general representation of the logic which may be used to perform any one of the core transformation described above by directly accessing the arrays created according to the second related invention. A typical process begins by locating the element having a particular name by searching through the element name array (Block 1400), and then obtaining (Block 1405) the node index of the element array entry with the matching name. Block 1410 gathers the information about this element, according to the type of short transformation being performed. This information is retrieved easily and efficiently using the located node index to index into the other arrays. An API (Application Programming Interface) is preferably invoked, as shown at Block 1415, to perform the particular transformation on this element's information.

Suppose the desired high-speed transformation specified by a map is deleting an element from a document. The logic shown in the flowchart of FIG. 14B may be used to perform this delete element operation. The process begins by searching through the element name array to locate the element having a particular name (Block 1420). This comprises using the starting and offset values, along with the buffer point, to find the text of the element name, and comparing that text to the particular name of interest. (Alternatively, the node index may be known in some cases, in which this search is not required.). Once the name is located, the corresponding node index is then available. (In some cases, multiple array entries may have the matching name, and the index of each such entry is then obtained, for example by building a list of indexes, in Block 1420.) The index of this element's parent is then obtained (Block 1425) by using the node index to access the parent array. The partent's index is then used (Block 1430) to access the children list array. The index of the element being deleted is then removed from the list for this parent. With reference to FIG. 5B, for example, to delete the element having the name "level_one_element2", which is shown at 420 in FIG. 4A, this node name is found in the array name entry having index 4. Using index 4 to access the parent array indicates that this element's patent has the index 0 (see 553 of FIG. 5D). Next using index 0 to index the children list array, the index value 4 is deleted from the list at 570.

The deleted element is now not reachable through the children list array. Preferably, the entries in each array for this deleted element are also removed to avoid incorrectly finding references to the element. This process (not shown in FIG. 14B) comprises using the element's index (obtained from the search in Block 1420), and setting the value of the array element having this index to a special value (such as a null value). The element's name, attribute names and attribute values (if any), and any element value may be completely removed from the buffer referenced by the pointers in the array of FIG. 5A and from the data buffer referenced by the pointers in the arrays of FIGS. 5B and 5C, if desired, by performing a compaction operation which will require recomputing the node indexes and starting locations for the remaining elements.

The flowchart in FIG. 14C provides a preferred embodiment of the logic that may be used for deleting an attributed of an element. The process begins by searching through the element name array to locate the element having a particular name (Block 1440), in order to obtain the corresponding node index (as has been described above with reference to Block 1420 of FIG. 14B). The index of the attribute to be deleted is then obtained (Block 1445). This comprises using the element's node index to access its information in the attribute array, and searching through the elements of this attribute array to located the attribute having a particular name. (Or, other approaches may be used when applicable. For example, the ordinal of the attribute to be deleted may be known in advance, in which case no search is necessary. Or, it may be desired to delete an attribute having a particular value, in which case the search looks for this value instead of for an attribute name.) Once the attribute index is known, the attribute is deleted (Block 1450) by removing that array element (for example, by removing the array element 536 from the array structure 530). Optionally, a compaction process may be performed as described with reference to FIG. 14B, where in this case the attribute's name and value are removed from the data buffer, the attribute specification is removed from the node specification of the appropriate element, and the indexes and starting positions are recomputed.

Based on the logic shown in FIGS. 14A through 14C, it will be obvious to one of ordinary skill in the art how to implement the other short transformations (such as adding elements, renaming elements, changing attribute values, etc.) in the core set of the preferred embodiment. (While the logic of FIGS. 14A through 14C was described in the second related invention as a means of operating upon the array-based structures, the present invention enhances the teachings therein through use of the map specifications, signatures, transformation objects and bindings to distinguish among processing engines in an automated manner, etc., thereby performing high-speed transformations in an efficient manner.)

Ideally, an optimal transformation performance result would be achieved by using a combination of fast XML document parsing, efficient internal data structures, and high-speed transformation processing. This optimal performance would be provided by switching the operation of prior art XML parsers and XSL stylesheet engines entirely, using instead the new machine-oriented mXML notation and array-based internal data structures of the first and second related inventions. However, it will be some time before this approach can be adopted because it requires modification of many existing software implementations and many documents which contain existing user data. Thus, the preferred embodiment of the present invention enables existing stylesheet engines to coexist with a high-performance map-based transformation engine that operates on a set of fixed transformations such as the set of 10 core operations previously described. This set of transformations is used to perform short transformations on well-formatted XML data, along with the new array-based data structure, to satisfy high-volume transactions requirements in the B2B environment.

Figure 15:
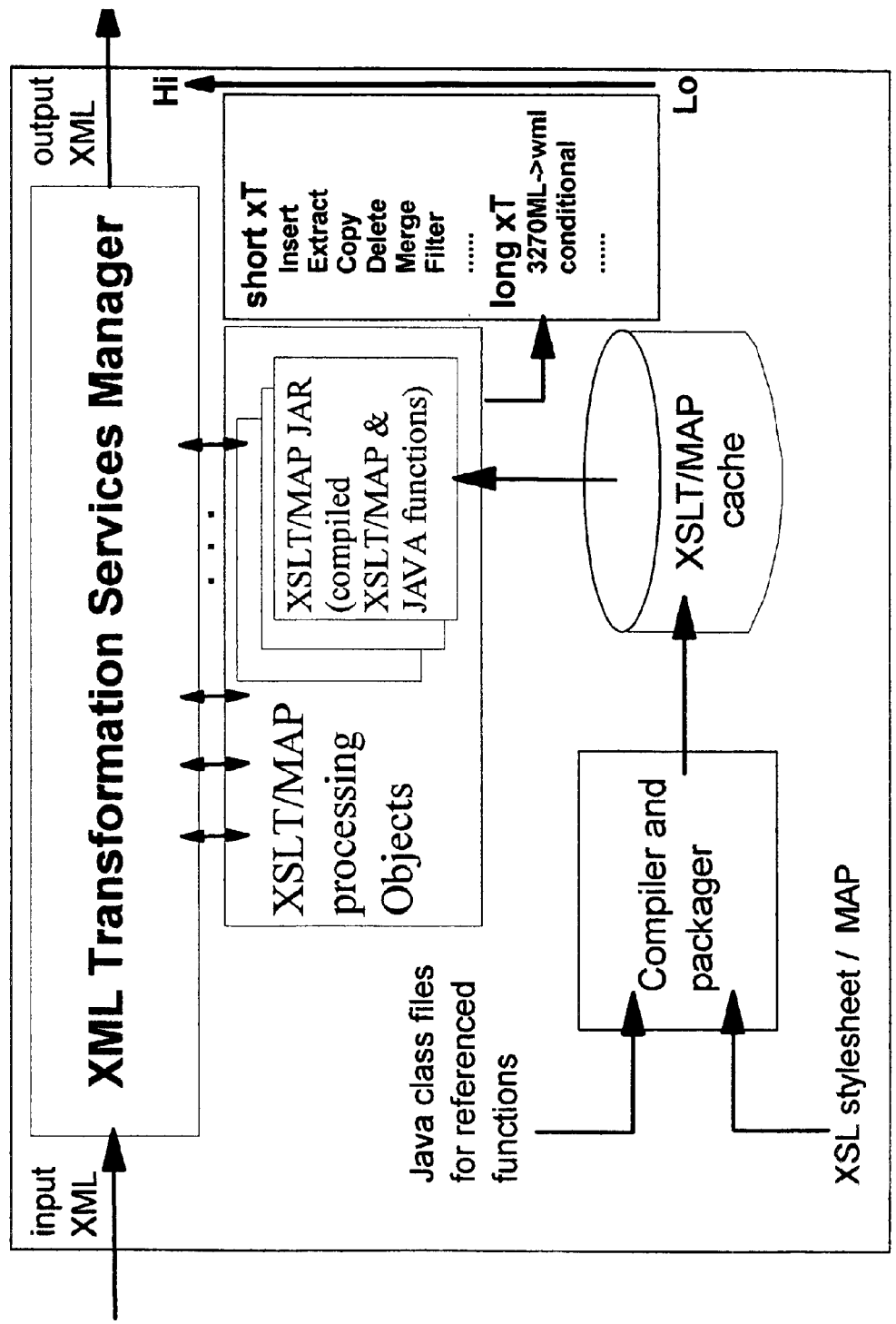
FIG. 15 illustrates the architecture of a system in which a preferred embodiment of the present invention operates.

This coexistence approach is depicted in FIG. 15, and includes a special parser that will parse the input XML data directly from the existing human readable format (or, alternatively, other formats such as mXML may be used) into the new array-based internal data structures; a set of maps (or "canned" XSLT stylesheets) defining a core set of transformations for reformatting the input XML on the fly; a special map-based transformation engine, optimized for processing the maps; a development process that enables binding (i) the map-based transformations such that they identify the need to use the special map-based processor and (ii) other transformations such that they identify the need to use the general XSLT engine; and an optional aggregation method that allows the combination of multiple map-based transformations into a type of "super transformation" (such as the example shown in FIG. 9) that may be performed in one operation thus avoiding the overhead of repetitive parsing. FIG. 15 illustrates this architecture as what may be termed "XML Transformation Manager", where short transformations are handled using the techniques disclosed herein and long transformations are handled using standard XSLT processing. The maps and XSLTs are prebundled in transformation processing objects ready to execute when a matching input document (such as an XML document) is received. Maps can also be preprocessed from canned XSLTs. The net effect of this technique is to provide a full-function XSLT processing method for a spectrum of transformation performance objectives. Both XSLT flexibility and specialized transformations are considered. The callable services may be directly invoked from transaction programs through a set of transformations APIs.

Catching and precompilation of general XSLT stylesheets may be utilized for general enhancements. Maps are easily converted into objects and cached for the special transformation engine's use. Some stylesheet processors such as Xalan from the Apache Software Foundation provide the capability to allow for precompiling stylesheets to improve stylesheet processing run-time performance. This capability can be further utilized to set up a cache of precomplied XSLTs together with the maps. FIG. 15 illustrates this as an XSLT and MAP combined cache that supports the XSLT/MAP processing objects component as described herein. A development process can first compile an XSLT into an object and store it into a media (such as disk storage) for future reference. It can then generate a specific processing object that waits on the input of a variable XML document to call the stylesheet processor engine with the complied XSLT object. The map object is likewise. All code generated will be packaged as a JAR file representing this processing object. At run time, the Transformation Services Manager uses these process objects which will have the XSLTs and maps already interpreted in object form and the processor engine ready to go.

The Transformation Services Manager can further set up an in-memory cache (e.g. a hash table) to store frequently used processing objects using an algorithm such as Last-In, First-Out (LIFO). Because an XML document signature can be specified when the processing object is built, the Transformation Services Manager can select a processing object for a caller automatically by matching processing object signatures with the input XML document. The caller could specify a specific signature to speed up the match processing or resolve conflict. If the caller knows what transformation to apply (i.e. XSLT or map), it can also specify this explicitly with a generic processing object.

The high-performance transformation technique of the present invention can be initially used for a core set of transformations, in the long term, this transformation technique can be extended to apply a general extensible document processing (e.g. XML/XSL processing). The transformation techniques disclosed herein may be used advantageously within an overall e-business or e-commerce system.

As has been demonstrated, the present invention provides an efficient technique for transforming arbitrarily structured documents which have certain well-formed and predictable elements, where this technique is an efficient alternative to use of stylesheet processing. Studies conducted by the inventors of the present invention show that the processing time can be reduced significantly by using this alternative processing technique.

While the preferred embodiment of the present invention has been described, additional variations and modifications in that embodiment may occur to those skilled in the art once they learn of the basic inventive concepts. In particular, the preferred embodiment may be adapted to changes in the XML and/or mXML notation, should they occur, and the inventive concepts disclosed herein may also be adapted for use with other notations that are syntactically similar to XNL and mXML. Therefore, it is intended that the appended claims shall be construed to include both the preferred embodiment and all such variations and modifications as fall within the spirit and scope of the invention.

APPENDIX A

```
<!-- An operation element contains one or more map elements defining an inline
     transformation method. Each map represents a primitive transformation,
     such as ADD, DELETE, FILTER, etc., from the current XML content to a new
     XML content. Inline operation provides high performance transformation
     for XMLs that conform to well-formatted DTDs, i.e. tags always present.
     The maps are executed sequentially. This element is optional and only
     one operation element can be included in the transform element. -->
<!-- The operation element has an attribute value describing its name:
     name    - optional, a name for this operation that can be referenced
               by other parts of the script to reuse this
               operation       -->
<!ELEMENT operation (map+)>
<!ATTLIST operation
     name CDATA #IMPLIED>
<!-- A map element contains one or more param elements to describe a simple mapping
     from the current XML document to the target document. Each param element contains
     a pair of source (current XML) and target values used by the map. This element is
     required and multiple map elements can be included in the operation element. -->
<!-- The map element has one attribute value describing the primitive
     transformation operation to he performed:
     opcode       - required,
"ADD|DELETE|COPY|MOVE|FILTER|REORDER|RENAME|MERGE|
            E2A|A2E", the primitive
            transformation operation code from source to target:
            ADD         - add selected nodes
            DELETE      - delete selected nodes
            COPY        - copy selected nodes
            MOVE        - move selected nodes
            FILTER      - separate selected nodes to multiple targets
            REORDER     - reorder the children sequence for a node
            RENAME      - rename selected nodes
            MERGE       - merge selected nodes with other nodes in target
            E2A         - convert selected nodes into attributes
            A2E         - convert attributes of selected nodes into
                          new nodes     -->
<!ELEMENT map (param+)>
<!ATTLIST map
     opcode (CDATA) #REQUIRED>
```

APPENDIX A-continued

```
<!-- A param element contains a pair of elements defining the relationship of the
     source and target nodes involved in the map. The snode defines qualified source nodes
     for the map operation. The tnode defines the resulting target nodes and placements from
     the map. This element is required and multiple param elements can be included in the
     map element. -->
<!-- The param element has a set of attribute values describing map parameters:
     snode      - required, a source element for the map
     tnode      - required, a target element for the map       -->
<!ELEMENT param (snode, tnode)>
<!-- The snode element: -->
<!-- An snode element contains an xmldata element to describe the XML data content
     to use as a source for the map operation. This element is required.       -->
<!-- The snode element has a set of attribute values describing the source node
     characteristics:
     doc           - optional, a name used to identify a transformation source document,
                     default is "null", means the source document
                     is the current transforming XML document
     collatekey    - optional, an attribute name for collation the source and target nodes,
                     for example, merge under a common purchase order number from
                     a partial purchase order document to a full document,
     default is "null" means no collation is specified
     pathback      - optional, number of backward path levels to preserve when the source node
                     is mapped to the target node, e.g. 2 means to go back two levels
                     from the current node. The default is "0", means
                     don't preserve the path information       -->
<!ELEMENT snode (xmldata)>
<!ATTLIST snode
   doc CDATA #IMPLIED
   collatekey CDATA #IMPLIED
   pathback CDATA #IMPLIED>
<!-- An xmldata element contains several xml_attribute elements
     to describe an xml element. This element is optional. -->
<!-- The xmldata element has a set of attribute values describing supplemental
     matching conditions for this xml element:
     tag           - optional, the name of the xml tag, default is "null" means
                     the tag name is ignored, or any tag name
     level         - optional, level of this tag in the document, e.g. 1 means the
                     root element. The default is "0", means any level
                     as it appears in the document.
     xpathindex    - optional, index of this element via path from the root element, e.g.
                     1.1.2.* means any child element of the second grandchild of
                     the root element. The default is "0", means any
                     element as it appears in the document of the specified level
     group         - optional, the group name where any match of the tags in the group
                     is treated the same as a match for this tag. E.g. if
                     tags A, B, and C are in a group together, then a match
                     of any one of them will be treaded as the match conditions
                     set for A, B, and C have been met. The default is
                     "null", means the tag is on its own.
     invertmatch   - optional, "true|false" indicating whether the matching of the
                     tag is inverted, i.e. the tag does not present,
                     default is "false" -->
<!ELEMENT xmldata (xml_attribute*)>
<!ATTLIST xmldata
   tag CDATA #IMPLIED
   level CDATA #IMPLIED
   xpathindex CDATA #IMPLIED
   group CDATA #IMPLIED
   invertmatch (true|false) "false">
<!-- An xml_attribute element contains a character data element specifying an attribute
     value to match. This element is optional. -->
<!-- Every xml_attribute element has a set of attribute values describing a match condition:
     name          - required, the name of the attribute
     value         - optional, the value of the attribute, default is "null" means
                     any value
     group         - optional, the group name where any match of the attribute in the group
                     is treated the same as a match for this attribute. E.g. if
                     attributes A, B, and C are in a group together, then a match
                     of any one of them will be treaded as the match conditions
                     set for A, B, and C have been met. The default is
                     "null", means the attribute is on its own.
     invertmatch   - optional, "true|false" indicating whether the matching of the
                     attribute is inverted, i.e. the attribute does not present or
                     not matching the value, default is "false" -->
<!ELEMENT xml_attribute (#PCDATA)>
<!ATTLIST xml_attribute
   name CDATA #REQUIRED
   value CDATA #IMPLIED
   group CDATA #IMPLIED
```

APPENDIX A-continued

```
    invertmatch (true|false) "false">
<!-- The tnode element: -->
<!-- A tnode element contains a tag element, one or more attribute element and an
    anchor element to describe the resulting target nodes for the map operation.
    This element is required.        -->
<!-- The tnode element has a set of attribute values describing the target node
    characteristics:
    doc           - optional, a name used to identify a transformation target document,
                    default is "null", means the target document
                    is what specified in the subsequent target element
    collatekey    - optional, an attribute name for collating the source and target nodes,
                    for example, merge under a common purchase order number from
                    a partial purchase order document to a full document,
    default is "null" means no collation is specified -->
<!ELEMENT tnode (tag?, attribute*, anchor?)>
<!ATTLIST tnode
    doc CDATA #IMPLIED
    collatekey CDATA #IMPLIED>
<!-- A tag element contains a character data element specifying the mapped tag name.
    This element is optional. If not specified the source node name is the mapped
    tag name. -->
<!ELEMENT tag (#PCDATA)>
<!-- An attribute element contains a character data element specifying the map of attribute
    name and values from the source node to the target node. This element is
    optional. If not specified, all attributes from the source mapped to the
    target.        -->
<!-- The attribute element has a set of attribute values describing the mapping of target
    node attributes:
    name    - required, an attribute name for the target node
    value   - required, an value for the attribute, can be character data or valid xpath
              expressions, for example, @id means the value of the id
              attribute from the source node    -->
<!ELEMENT attribute (#PCDATA)>
<!ATTLIST attribute
    name CDATA #REQUIRED
    value CDATA #REQUIRED>
<!-- An anchor element contains an xmldata element to describe the placement of the
    mapped node in the target document. This element is optional. If not specified,
    the anchor is determined based on the tag name from the template or from nodes
    already mapped into the target document. For example, a source node with path
    preserved to target nodes already mapped.    -->
<!-- The anchor element has a set of attribute values describing the anchor position
    for the mapped target node from its preserved path:
    rel     - optional, "SIBLING|PARENT|CHILD|SELF", the relationship
              between the target node and the anchor element:
              SIBLING    - the anchor is a sibling of the target node
              PARENT     - the anchor is the parent of the target node
              CHILD      - the anchor is a child of the target node
              SELF       - the anchor is the target node itself, default
    place   - optional, "TOP|BOTTOM|BEFORE|AFTER|*", the placement of the target
              node with respect to its anchor:
              TOP        - place the target node at the top of its kind
              BOTTOM     - place the target node at the bottom of its kind
              BEFORE     - place the target node before the current anchor
              AFTER      - place the target node after the current anchor
              *          - place the target node where the anchor is,
                           default    -->
<!ELEMENT anchor (xmldata)>
<!ATTLIST anchor
    rel CDATA #IMPLIED
    place CDATA #IMPLIED>
<!-- End of the operation element -->
```

APPENDIX B

```
<!-- The description element: -->
<!-- A description element describes an interaction state represented by the
    XML data content expected. The content is recognized by one or more
    xmldata elements), or unconditional by anything. An XML document
    that matches the descriptions is recognized as being in this state. Since the
    primary use of the script is for well-formatted data, matching selected xml
    elements is an effective way of recognizing the XML document content.
    Note just matching the XML document name may not be enough to describe the
    content needs to be recognized. This element is required.    -->
<!-- The description element has a set of attribute values describing a quick
    identification for the XML document:
```

APPENDIX B-continued

```
dtd        - optional, a dtd name used to identify the type of document, default
             is "null", means the document can by any type
id         - optional, a character string to identity the id attribute value on
             the root element of the document, default is
             "null" means to ignore any id attribute
             on the root element         -->
<!ELEMENT description xmldata*>
<!ATTLIST description
  dtd CDATA #IMPLIED
  id CDATA #IMPLIED>
<!-- An xmldata element contains several xml_attribute elements
  to describe an xml element. This element is optional. -->
<!-- The xmldata element has a set of attribute values describing supplemental
  matching conditions for this xml element:
  tag        - optional, the name of the xml tag, default is "null" means
               the tag name is ignored, or any tag name
  level      - optional, level of this tag in the document, e.g. 1 means the
               root element. The default is "0", means any level
               as it appears in the document.
  xpathindex - optional, index of this element via path from the root element, e.g.
               1.1.2.* means any child element of the second grandchild of
               the root element. The default is "0", means any
               element as it appears in the document of the specified level
  group      - optional, the group name where any match of the tags in the group
               is treated the same as a match for this tag. E.g. if
               tags A, B, and C are in a group together, then a match
               of any one of them will be treaded as the match conditions
               set for A, B, and C have been met. The default is
               "null", means the tag is on its own.
  invertmatch - optional, "true|false" indicating whether the matching of the
               tag is inverted, i.e. the tag does not present,
               default is "false" -->
<!ELEMENT xmldata (xml_attribute*)>
<!ATTLIST xmldata
  tag CDATA #IMPLIED
  level CDATA #IMPLIED
  xpathindex CDATA #IMPLIED
  group CDATA #IMPLIED
  invertmatch (true|false) "false">
<!-- An xml_attribute element contains a character data element specifying an attribute
  value to match. This element is optional. -->
<!-- Every xml_attribute element has a set of attribute values describing a match condition:
  name       - required, the name of the attribute
  value      - optional, the value of the attribute, default is "null" means
               any value
  group      - optional, the group name where any match of the attribute in the group
               is treated the same as a match for this attribute. E.g. if
               attributes A, B, and C are in a group together, then a match
               of any one of them will be treaded as the match conditions
               set for A, B, and C have been met. The default is
               "null", means the attribute is on its own.
  invertmatch - optional, "true|false" indicating whether the matching of the
               attribute is inverted, i.e. the attribute does not present or
               not matching the value, default is "false" -->
<!ELEMENT xml_attribute (#PCDATA)>
<!ATTLIST xml_attribute
  name CDATA #REQUIRED
  value CDATA #IMPLIED
  group CDATA #IMPLIED
  invertmatch (true|false) "false">
<!-- End of the description element -->
```

What is claimed:

1. A computer program product embodied on one or more computer-readable media, the computer program product adapted for efficiently transforming extensible structured documents and comprising:

computer-readable program code means for identifying a source document type;

computer-readable program code means for specifying one or more fast transformations to be performed on documents of the source document type;

computer-readable program code means for specifying a source node description and a target node description for each of the specified fast transformations;

computer-readable program code means for storing transformation information for each of the specified fast transformations, the transformation information comprising a transformation identifier, a source node description, and the target node description; and computer-readable program code means for processing incoming source documents to generate output documents using the stored transformation information, further comprising:

computer-readable program code means for receiving a source document;

computer-readable program code means for selecting, manually or based upon a comparison of the received some document to the stored transformation information, zero or more fast transformations to be performed;

computer-readable program code means for applying the selected fast transformations; and computer-readable program code means for generating one or more output documents using a result of the computer-readable program code means for applying.

2. The computer program product according to claim 1, wherein the received source document is an Extensible Markup Language (XML) document.

3. The computer program product according to claim 2, further comprising computer-readable program code means for parsing the XML document.

4. The computer program product according to claim 1, wherein the received source document is an array-based representation of an Extensible Markup Language (XML) document.

5. The computer program product according to claim 4, and wherein the computer-readable program code means for applying the selected transformations further comprises computer-readable program code means for manipulating selected nodes by manipulating the array-based representation.

6. The computer program product according to claim 1, wherein the received source document is a machine-oriented markup language document.

7. The computer program product according to claim 1, wherein the received source document is an array-based representation of a machine-oriented markup language document.

8. The computer program product according to claim 1, wherein the received source document is a parsed representation of an extensive document.

9. The computer program product according to claim 1, wherein the source node description identifies one or more source nodes in an input document of the source document type and wherein the target node description identifies zero or more target nodes in an output tree to be generated in the one or more output documents.

10. The computer program product according to claim 1, wherein the computer-readable program code means for processing further comprises computer-readable program code means for applying a general purpose transformation engine to perform transformations other than the selected fast transformations, wherein the general purpose transformation engine is a stylesheet engine, and wherein the computer-readable program code means for generating uses the result of the computer-readable program code means for applying the selected fast transformations as well as a result of the computer-readable program code means for applying the general purpose transformation engine.

11. The computer program product according to claim 10, wherein the stylesheet engine is an Extensible Stylesheet Language (XSL) engine.

12. A system for transforming extensible structured documents, comprising;

means for specifying fast transformations to be applied to incoming source documents, further comprising:

means for specifying a signature that identifies a source document type;

means for specifying one or more fast transformations to be performed on documents that match the specified signature;

means for specifying a source node description and a target node description for each of the specified fast transformations; and means for storing transformation information for each of the specified fast transformations, the transformation information comprising a transformation identifier, the source node description, and the target node description;

means for applying the fast transformations to particular incoming source documents matching criteria of the specified fast transformations; and means for applying general purpose transformation to incoming source documents not matching criteria of the specified fast transformations.

13. The system according to claim 12, wherein the means for applying the fast transformations further comprises:

means for receiving a source document;

means for selecting, manually or based upon a comparison of the received source document to the stored transformation information, zero or more fast transformations to be performed; and means for applying the selected fast transformations by manipulating selected nodes of the received source document according to the selected fast transformations.

14. The system according to claim 13, wherein the received source document is an Extensible Markup Language (XML) document.

15. The system according to claim 14, further comprising means for parsing the XML document.

16. The system according to claim 13, wherein the received source document is an array-based representation of an Extensible Markup Language (XML) document.

17. The system according to claim 13, wherein the received source documents is an array-based representation of an Extensible Markup Language (XML) document, and wherein the means for applying the selected fast transformations by manipulating selected nodes further comprises means for manipulating the array-based representation.

18. The system according to claim 13, wherein the received source document is a machine-oriented markup language document.

19. The system according to claim 13, wherein the received source document is an array-based representation of a machine-oriented markup language document.

20. The system according to claim 13, wherein the received source document is a parsed representation of an extensible document.

21. The system according to claim 12, wherein the source node description identifies one or more source nodes in an input document of the source document type and wherein the target node description identifies zero or more target nodes to be generated in one or more output documents, responsive to operation of the means for applying the fast transformations.

22. The system according to claim 12, wherein the general purpose transformations are applied using a stylesheet engine.

23. The system according to claim 22, wherein the stylesheet engine is an Extensible Stylesheet Language (XSL) engine.

24. A method for transforming extensible structured documents, comprising the steps of:

specifying fast transformations to be applied to incoming source documents, further comprising the steps of:

specifying a signature that identifies a source document type;

specifying one or more fast transformations to be performed on documents that match the specified signature;

specifying a source node description and a target node description for each of the specified fast transformations; and storing transformation information for each of the specified fast transformations, the transformation information comprising a transformation identifier, the source node description, and the target node description;

applying the fast transformations to particular incoming source documents matching criteria of the specified fast transformations; and applying general purpose transformations to incoming source documents not matching criteria of the specified fast transformations.

25. The method according to claim 24, wherein the step of applying the fast transformations further comprises the steps of:

receiving a source document;

selecting, manually or based upon a comparison of the received source document to the stored transformation information, zero or more fast transformations to be performed; and applying the selected fast transformations by manipulating selected nodes of the received source document according to the selected fast transformations.

26. The method according to claim 25, wherein the received source document is an Extensible Markup Language (XML) document.

27. The method according to claim 26, further comprising the step of parsing the XML document.

28. The method according to claim 25, wherein the received source document is an array-based representation of an Extensible Markup Language (XML) document.

29. The method according to claim 25, wherein the received source document is an array-based representation of an Extensible Markup Language (XML) document, and wherein the step of applying the selected fast transformations by manipulating selected nodes further comprises the step of manipulating the array-based representation.

30. The method according to claim 25, wherein the received source document is a machine-oriented markup language document.

31. The method according to claim 25, wherein the received source document is an array-based representation of a machine-oriented markup language document.

32. The method according to claim 25, wherein the received source document is a parsed representation of an extensible document.

33. The method according to claim 24, wherein the source node description identifies one or more source nodes in an input document of the source document type and wherein the target node description identifies zero or more target nodes to be generated in one or more output documents, responsive to operation of the step of applying the fast transformations.

34. The method according to claim 24, wherein the general purpose transformations are applied using a stylesheet engine.

35. The method according to claim 34, wherein the stylesheet engine is an Extensible Stylesheet Language (XSL) engine.

36. The method according to claim 25, further comprising the step of preloading one or more templates prior to operation of the step of applying the select fast transformations.

37. The method according to claim 24, further comprising using a result of the step of applying the fast transformations and a result of the step of applying general purpose transformations to create an output document, and wherein the source document and/or the output document may be represented as in-memory structures which may have been produced by or may be sent to another software process.

* * * * *

UNITED STATES PATENT AND TRADEMARK OFFICE
CERTIFICATE OF CORRECTION

PATENT NO. : 6,941,511 B1
DATED : September 6, 2005
INVENTOR(S) : Hind et al.

It is certified that error appears in the above-identified patent and that said Letters Patent is hereby corrected as shown below:

Column 27,
Line 34, between "an" and "document" replace "extensive" with -- extensible --.

Column 30,
Line 27, between "the" and "fast" replace "select" with -- selected --.

Signed and Sealed this

Seventh Day of March, 2006

JON W. DUDAS
*Director of the United States Patent and Trademark Office*